United States Patent
Tsuda et al.

(10) Patent No.: US 6,980,270 B2
(45) Date of Patent: Dec. 27, 2005

(54) ACTIVE MATRIX SUBSTRATE, LIQUID CRYSTAL DISPLAY PANEL OF TRANSFLECTIVE TYPE, AND LIQUID CRYSTAL DISPLAY DEVICE OF TRANSFLECTIVE TYPE

(75) Inventors: Kazuhiko Tsuda, Ikoma-gun (JP); Kozo Nakamura, Tenri (JP); Makoto Kanbe, Sakurai (JP); Satoru Kishimoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 54 days.

(21) Appl. No.: 10/644,950

(22) Filed: Aug. 21, 2003

(65) Prior Publication Data

US 2004/0036827 A1    Feb. 26, 2004

(30) Foreign Application Priority Data

Aug. 23, 2002  (JP) .............................. 2002-243947

(51) Int. Cl.[7] ...................... G02F 1/136; G02F 1/1335; G02F 1/1337
(52) U.S. Cl. ........................ 349/114; 349/113; 349/42; 349/129
(58) Field of Search .................... 349/42, 113, 114, 349/129

(56) References Cited

U.S. PATENT DOCUMENTS

| | | | |
|---|---|---|---|
| 5,365,355 A * | 11/1994 | Hastings et al. | 349/42 |
| 6,195,140 B1 | 2/2001 | Kubo et al. | |
| 6,281,952 B1 * | 8/2001 | Okamoto et al. | 349/12 |
| 6,614,496 B1 * | 9/2003 | Song et al. | 349/114 |
| 6,734,935 B2 * | 5/2004 | Kim et al. | 349/114 |
| 6,791,648 B2 * | 9/2004 | Tanaka et al. | 349/129 |
| 2003/0025859 A1 * | 2/2003 | Moon et al. | 349/113 |

* cited by examiner

*Primary Examiner*—Huyen Ngo
(74) *Attorney, Agent, or Firm*—Nixon & Vanderhye P.C.

(57) ABSTRACT

A liquid crystal display device of a transflective type of the present invention is so arranged that a transparent electrode and a reflective electrode that compose a pixel do not match in position with each other, and the reflective electrode straddles a gate bus line and a source bus line. With this, a transparent electrode and a reflective electrode that are adjacent to each other without being electrically connected are arranged so as to overlap with each other, when viewed in the normal direction of the display surface, thereby eliminating an inter-pixel region therebetween. This reduces a ratio of the inter-pixel region with respect to the display screen, so that it is possible to further improve a pixel aperture ratio and to improve light utilization efficiency.

15 Claims, 22 Drawing Sheets

ACTIVE MATRIX SUBSTRATE, LIQUID CRYSTAL DISPLAY PANEL OF TRANSFLECTIVE TYPE, AND LIQUID CRYSTAL DISPLAY DEVICE OF TRANSFLECTIVE TYPE

FIELD OF THE INVENTION

The present invention relates to a liquid crystal panel structure of a liquid crystal display device of a transflective type, and in particular to a liquid crystal display device of a transflective type that has an improved pixel aperture ratio and realizes light display with excellent light utilization efficiency.

BACKGROUND OF THE INVENTION

In these years, application of a liquid crystal display device to a word processor, a laptop personal computer, a pocket television, etc. has been rapidly advanced. Among the liquid crystal display devices, a liquid crystal display device of a reflection type can show display using ambient light without the use of a backlight, and consumes a smaller amount of power compared with a liquid crystal display device of a transmission type. Thus, the liquid crystal display device of the reflection type has been recently used for a portable game device, a PDA (Personal Digital Assistant) device, etc.

Further, in these years, a liquid crystal display device of a transflective type has been developed, in which a liquid crystal display screen can show both reflection display and transmission display. The liquid crystal display device of the transflective type can achieve fine display without consuming a large amount of power by showing the reflection display using ambient light when the surroundings are bright; and can achieve fine display by showing the transmission display with turning on a backlight when the surroundings are dark. Thus, the liquid crystal display device of the transflective type has come to receive attention particularly as a display for a cellular phone.

A conventional liquid crystal display device of the transflective type generally has a system as shown in Japanese Unexamined Patent Publication No. 101992/1999 (Tokukaihei 11-101992, published on Apr. 13, 1999; corresponding to U.S. Pat. No. 6,195,140). The liquid crystal display device disclosed in Tokukaihei 11-101992 has an arrangement as shown in FIG. 22. Namely, a plurality of gate bus lines 101 and a plurality of source bus lines 102 cross with each other, and, in a matrix manner, a pixel electrode is provided via a switching element (not shown) at each intersection where the plurality of gate bus lines 101 and the plurality of source bus lines 102 cross.

Further, the pixel electrode is composed of a transparent electrode and a reflective electrode that are electrically connected with each other. These electrodes are arranged in the following manner. A transparent insulating layer (not shown) is formed on the gate bus line 101, the source bus line 102, and the switching element. On the transparent insulating layer, the transparent electrode and the reflective electrode are sequentially formed, allowing a part of the reflective electrode to have an opening for light transmission. In the liquid crystal display device, a region where the reflective electrode is formed (reflection region; shown as the shaded portion in FIG. 22) 103 shows reflection display; while the opening provided in the reflective electrode (transmission region; shown as the dotted portion in FIG. 22) 104 shows transmission display.

However, in the conventional liquid crystal display device of the transflective type, each pixel area is composed of the reflection region 103 and the transmission region 104, and each pixel area is surrounded by an inter-pixel region that insulates adjacent pixels from one another. The inter-pixel region is formed in an etching step for forming the transmission and reflection regions, and thus requires a width of at least about 5 $\mu$m.

Since the inter-pixel region does not contribute to the screen display, a larger ratio of the inter-pixel region with respect to the display screen decreases an aperture ratio. In particular, when a pixel size decreases in a liquid crystal display panel of high definition, the ratio that the inter-pixel region occupies the display screen accordingly increases. Thus, in a liquid crystal display panel used for a cellular phone display, etc., the inter-pixel region occupies about 20 percent of the entire display screen, resulting in that the aperture ratio of the liquid crystal display panel is limited up to about 80 percent.

SUMMARY OF THE INVENTION

In order to solve the above problems, the present invention has an object to provide a liquid crystal display device of a transflective type that has an improved pixel aperture ratio by reducing an area of an inter-pixel region on a display screen, and thus has high light utilization efficiency.

In order to attain the foregoing object, an active matrix substrate of the present invention, used for a liquid crystal display device of a transflective type that includes pixel electrodes each having a reflective electrode and a transparent electrode, is so arranged that (i) a reflective electrode and (ii) an adjacent transparent electrode adjacent to the reflective electrode without being electrically connected are positioned in such a manner that (A) a border of a reflection region to which the reflective electrode applies a voltage and (B) a border of a transmission region to which the adjacent transparent electrode applies a voltage at least partly overlap or are closely located with each other, when viewed in a normal direction of a display surface of the active matrix substrate.

With this arrangement, a reflective electrode and a transparent electrode that are adjacent to each other without being electrically connected are positioned in such a manner that the border of the reflection region and the border of the transmission region at least partly overlap (or are closely located) with each other. This eliminates (or reduces) the inter-pixel region at a portion where the border of the reflection region and the border of the transmission region overlap (or are closely located) with each other.

With this, in a liquid crystal display panel using the above-described active matrix substrate, it is possible to reduce a ratio of the inter-pixel region, which does not contribute to display, with respect to the entire display screen, thereby achieving a liquid crystal display panel having a high aperture ratio.

Further, a liquid crystal display panel of a transflective type of the present invention is so arranged that the above-described active matrix substrate and a counter substrate sandwich a liquid crystal layer.

Further, a liquid crystal display device of a transflective type of the present invention is provided with the above-described liquid crystal display panel.

In the above-arranged liquid crystal display panel of the transflective type and the liquid crystal display device of the transflective type, as in the above-described active matrix substrate, it is possible to reduce a ratio of the inter-pixel region, which does not contribute to display, with respect to the entire display screen, thereby achieving a high aperture ratio.

For a fuller understanding of the nature and advantages of the invention, reference should be made to the ensuing detailed description taken in conjunction with the accompanying drawings.

DESCRIPTION OF THE EMBODIMENTS

[First Embodiment]

The following will explain an embodiment of the present invention with reference to the drawings.

Figure 1:
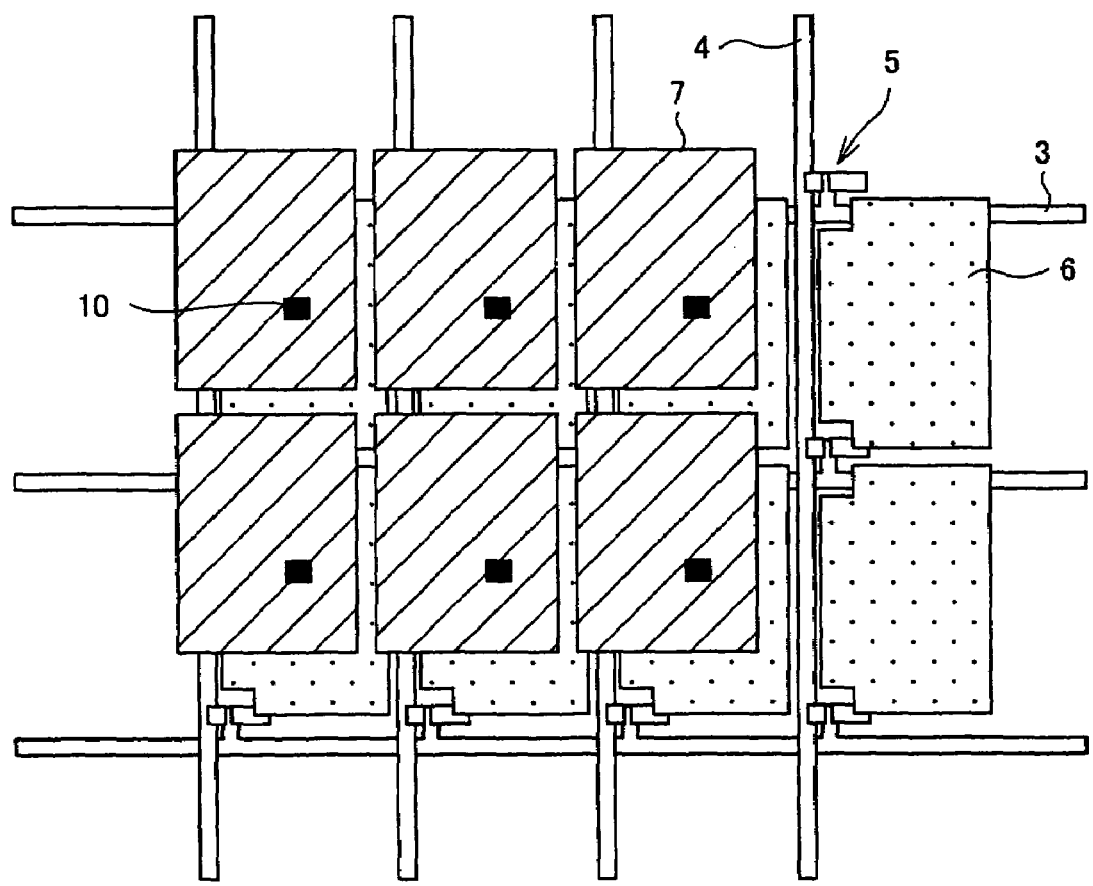
FIG. 1 is a plan view schematically showing an arrangement of an active matrix substrate of First Embodiment, which shows an embodiment of the present invention.
Figure 2:
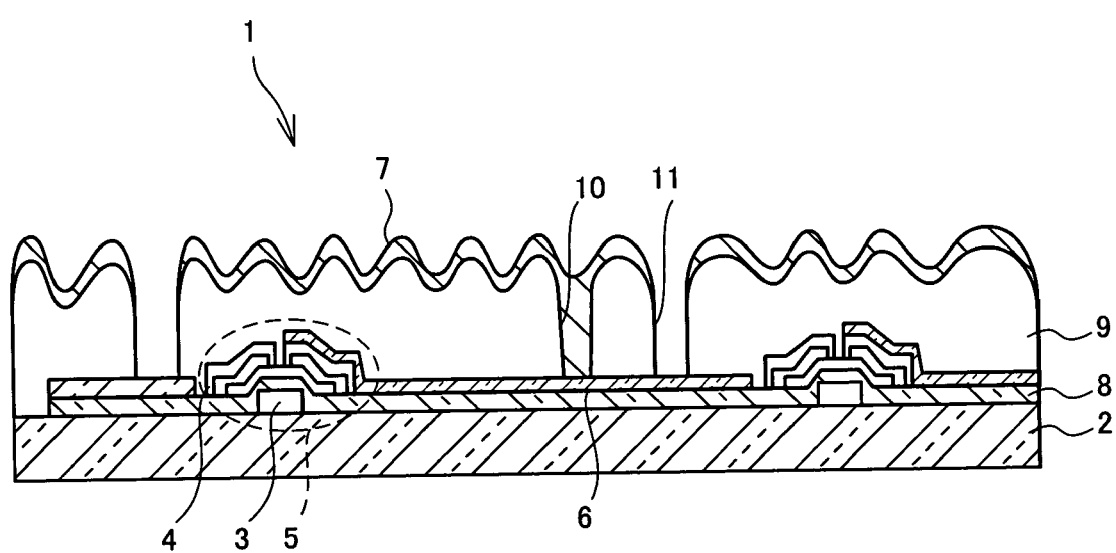
FIG. 2 is a cross-sectional view showing the arrangement of the active matrix substrate.

First, with reference to FIGS. 1 and 2, explained is an arrangement of an active matrix substrate used in a liquid crystal display device of a transflective type in accordance with the present embodiment.

An active matrix substrate 1 is so arranged that a gate bus line (gate wiring) 3, a source bus line (source wiring) 4, and a TFT (Thin Film Transistor) element 5 as a switching element are formed on a transparent substrate 2 that is made of glass, etc. This arrangement is the same with the conventional arrangement, and thus detailed explanation thereof will be omitted here.

In the active matrix substrate 1, a pixel electrode is composed of a transparent electrode 6 and a reflective electrode 7. The transparent electrode 6 is formed on the transparent substrate 2 via a transparent insulating layer 8, and is connected to the drain of the TFT element 5. The transparent insulating layer 8 is formed over an entire display screen area of the active matrix substrate 1, as an interlayer insulating film between the gate bus line 3 and the source bus line 4.

An insulating layer 9 is formed on the gate bus line 3, the source bus line 4, the TFT element 5, and the transparent electrode 6. Further, the reflective electrode 7 is formed at an upper layer of the transparent electrode 6 via the insulating layer 9. Further, the transparent electrode 6 and the reflective electrode 7 are electrically connected with each other via a contact hole 10 provided in the insulating layer 9.

Further, an opening 11 is formed in the insulating layer 9 at a portion where the reflective electrode 7 is not formed. The opening 11, which reveals the transparent electrode 6, becomes a transmission region for showing transmission display. Note that, the insulating layer 9 does not always require the opening 11. When the insulating layer 9 is formed with a transparent insulating layer, the opening 11 is not required to form the transmission region. In this case, the transmission region is formed at an upper portion of the transparent electrode 6 on which the reflective electrode 7 is not formed.

On the other hand, the reflective electrode 7 is arranged to cover the gate bus line 3, the source bus line 4, and the TFT element 5. Namely, the transparent electrode 6 is placed within each block area that is separated by the gate bus lines 3 and the source bus lines 4; while the reflective electrode 7 is placed so as to extend outside the block area, and to superpose the transparent electrodes 6 inside adjacent block areas in vertical and horizontal scanning directions, straddling the gate bus line 3 and the source bus line 4. In other words, the reflective electrode 7 is formed at the upper layer of the transparent electrode 6, but covers at least part of the inter-pixel region with respect to the transparent electrode 6, thereby consequently reducing an area that the inter-pixel region occupies.

By arranging the transparent electrode 6 and the reflective electrode 7 in the active matrix substrate 1 as described above, a boundary of the reflection region (indicated by a shaded portion in plan views hereinafter) overlaps a boundary of the transmission region (indicated by a dotted portion in plan views hereinafter) almost all around the pixel electrode, as shown in FIG. 1, when the planar surface of the active matrix substrate 1 is viewed in a direction of the normal line. The inter-pixel region does not arise where the reflection region overlaps the transmission region, thereby remarkably improving an aperture ratio of a liquid crystal display panel using the active matrix substrate 1.

Figure 3:
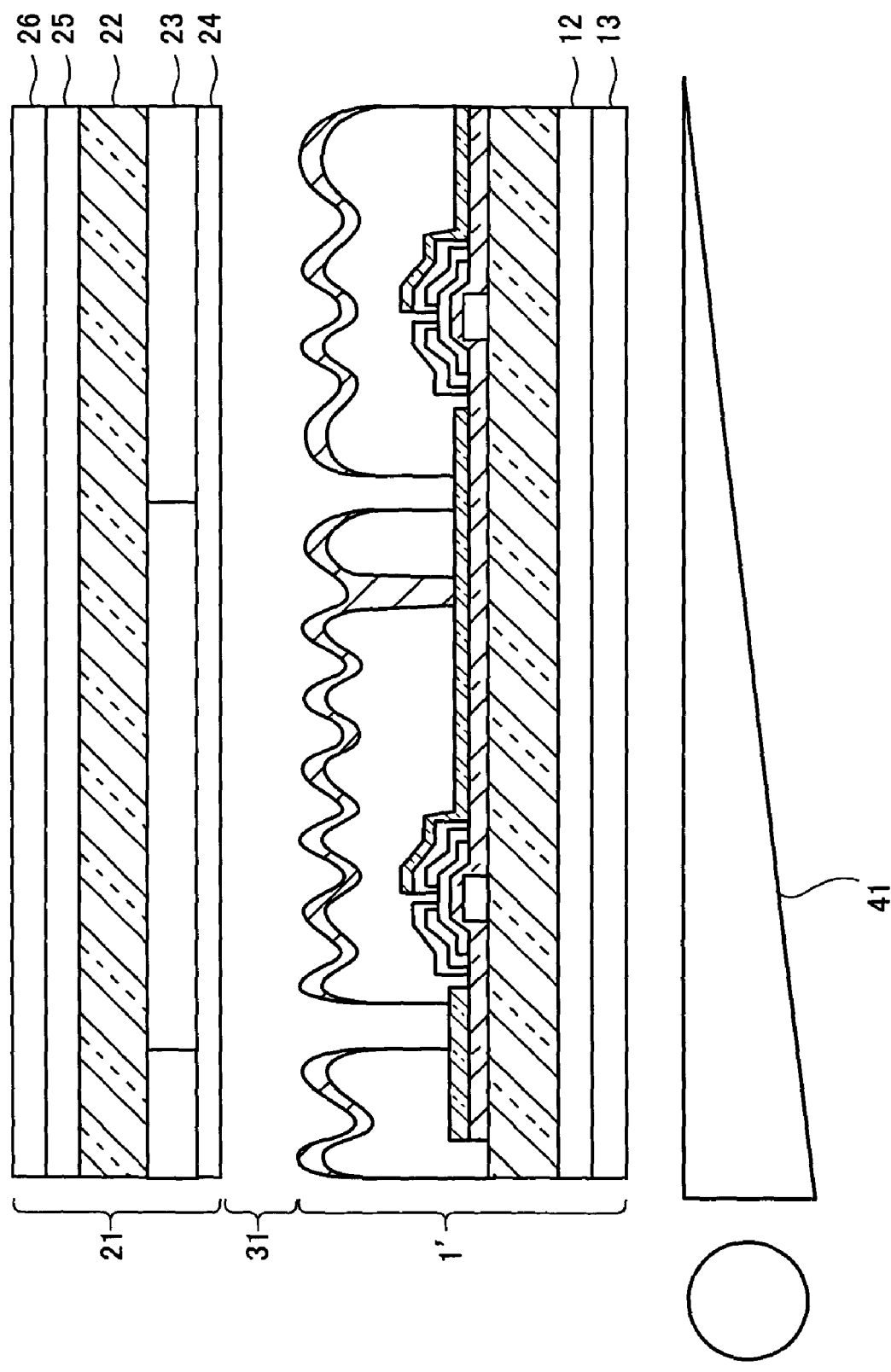
FIG. 3 is a cross-sectional view showing an arrangement of a liquid crystal display panel using the active matrix substrate.

FIG. 3 is a cross-sectional view of a liquid crystal display panel of a transflective type that is manufactured using the active matrix substrate 1.

The liquid crystal display panel has an arrangement such that an active matrix substrate 1' and a counter substrate 21 sandwich a liquid crystal layer 31. Note that, the active matrix substrate 1' in FIG. 3 is so arranged that a retardation film 12 and a polarizer 13 are provided on the active matrix substrate 1 in FIG. 2 on the opposite side from a surface facing the liquid crystal layer 31. Further, the counter substrate 21 is so arranged that a color filter 23 and a counter electrode 24 are provided on a glass substrate 22 on a surface facing the liquid crystal layer 31, and a retardation film 25 and a polarizer 26 are provided on the glass substrate 22 on the opposite surface.

In the liquid crystal display panel as arranged above, a voltage (namely, data signal) supplied from the gate bus line 4 is applied to the transparent electrode 6 via the TFT element 5, and then applied via the contact hole 10 to the reflective electrode 7 on the insulating layer 9. With this, (A) either the transparent electrode 6 or the reflective electrode 7 on the active matrix substrate 1' and (B) the counter electrode 24 on the counter substrate 21 generate a potential difference, and the liquid crystal layer 31 is driven by the potential difference.

Further, the liquid crystal display panel is so arranged that, in the active matrix substrate 1', the insulating layer 9 has the opening 11. In this arrangement, the transmission region and the reflection region may have different cell thicknesses of the liquid crystal layer 31 so that the transmission region has the cell thickness more than the reflection region by a thickness of the insulating layer 9. This arrangement is preferable because retardation changes of the liquid crystal layer 31 upon the voltage application can be reduced. Further, when the cell thickness of the transmission region is twice as that of the reflection region, a light path length of light in the reflection region (through which light passes twice when back and forth) becomes equal to a light path length of light in the transmission region (through which light passes once in one direction). This arrangement is most preferable because the same optical changes are achieved all over the liquid crystal layer 31 in response to the voltage application.

Here, in the liquid crystal display panel having the arrangement shown in FIG. 1, when a pixel pitch is 270 μm in height and 90 μm in width, and a width between the reflective electrodes and a width between the transparent electrodes are both 7 μm, for example, the aperture ratio is calculated as follows: the aperture ratio of the reflection region is 89.8%, the aperture ratio of the transmission region is 8.9%, and the total aperture ratio is 98.7%. Namely, it is possible to realize a liquid crystal display panel of the transflective type having excellent light utilization efficiency.

Figure 4:
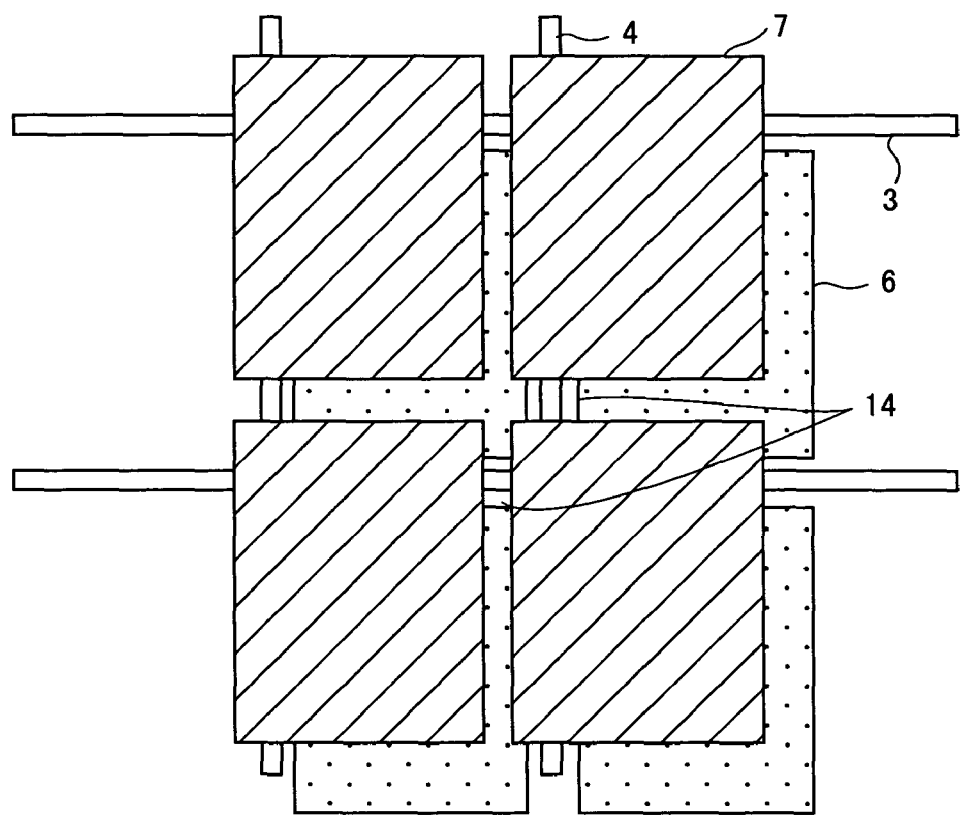
FIG. 4(a) is a plan view showing blank regions arising in the active matrix substrate.
FIG. 4(b) is a plan view showing light-shielding layers provided corresponding to the blank regions.
Figure 4:
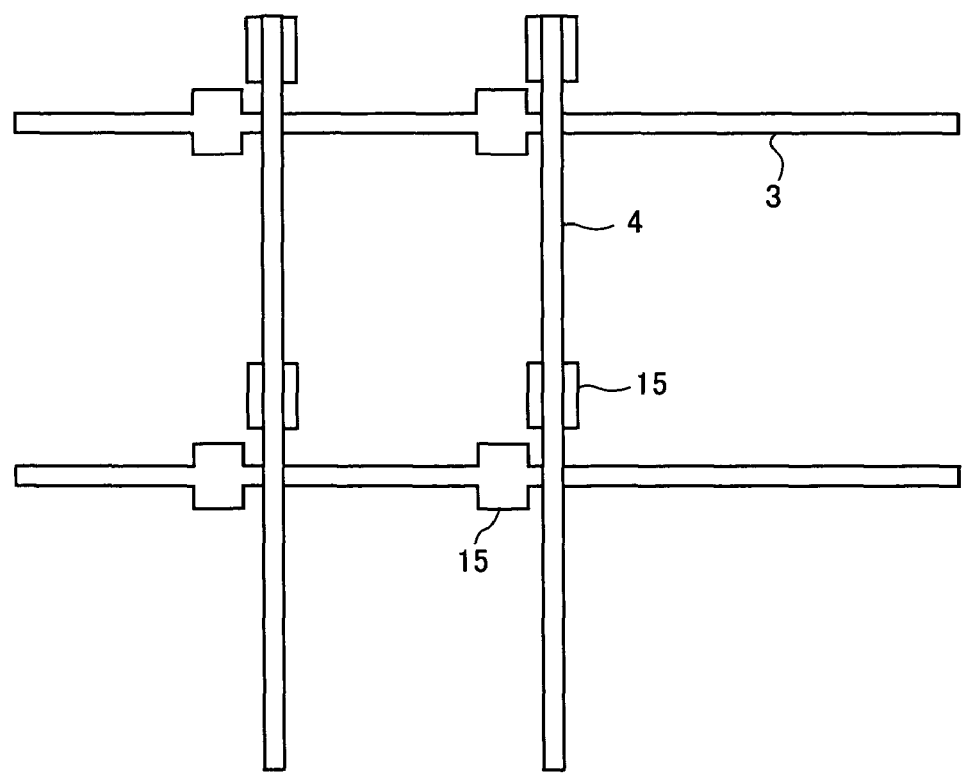

As described above, in the liquid crystal display panel having the above arrangement, most of the display screen can contribute to display as either the transmission region or the reflection region. However, between adjacent reflective electrodes 7 and between adjacent transparent electrodes 6, there remains a small area of inter-pixel region that does not contribute to display, as shown in FIG. 4(a). Further, the gate bus line 3 or the source bus line 4 is located in the inter-pixel region, and there remains a certain area of blank region 14 between (A) the gate bus line 3 or the source bus line 4 and (B) the transparent electrode 6.

Namely, even in the active matrix substrate 1 which eliminates the inter-pixel region in each pixel electrode composed of the transparent electrode 6 and the reflective electrode 7, the inter-pixel region in a grid manner still exists between the transparent electrodes 6 and between the reflective electrodes 7. Further, where the inter-pixel region of the transparent electrodes 6 and the inter-region of the reflective electrodes 7 cross, there is the blank region 14 to which neither the transparent electrode 6 nor the reflective electrode 7 can apply a voltage.

The blank region 14 cannot apply a voltage to the liquid crystal layer 31. Thus, when a substrate corresponding to the blank region 14 transmits light, the blank region 14 always shows white display in the normally white mode, thus decreasing the contrast.

Therefore, in a liquid crystal display panel of the normally white mode, as shown in FIG. 4(b), a light-shielding layer 15 corresponding to the blank region 14 needs to be provided at a layer different from the transparent electrode 6 and the reflective electrode 7. The light-shielding layer 15 is preferably formed in a step of forming the gate bus line 3 or the source bus line 4, without an additional step (FIG. 4(b) shows a case where the light-shielding layer 15 is formed in the step of forming the gate bus line 3). Incidentally, the light-shielding layer 15 is not required in the normally black mode where the blank region 14 always shows black display.

Note that, the present embodiment has been explained an example which aims to obtain an area of the reflective electrode 7 as large as possible. However, a ratio of the reflection region to the transmission region is not limited to this. In other words, the transparent electrode 6 and the reflective electrode 7 can be set to have any shape and area. FIGS. 5 through 13 will show variant examples.

Each of the arrangements shown in FIGS. 5 through 13 is such that the reflective electrode 7 covers both the gate bus line 3 and the source bus line 4. Note that, in FIGS. 5 through 13, illustration of some members such as an electrode and wiring are omitted to clearly show the shape of the transparent electrode 6, the position where the TFT element 5 connects the transparent electrode 6, etc.

Figure 5:
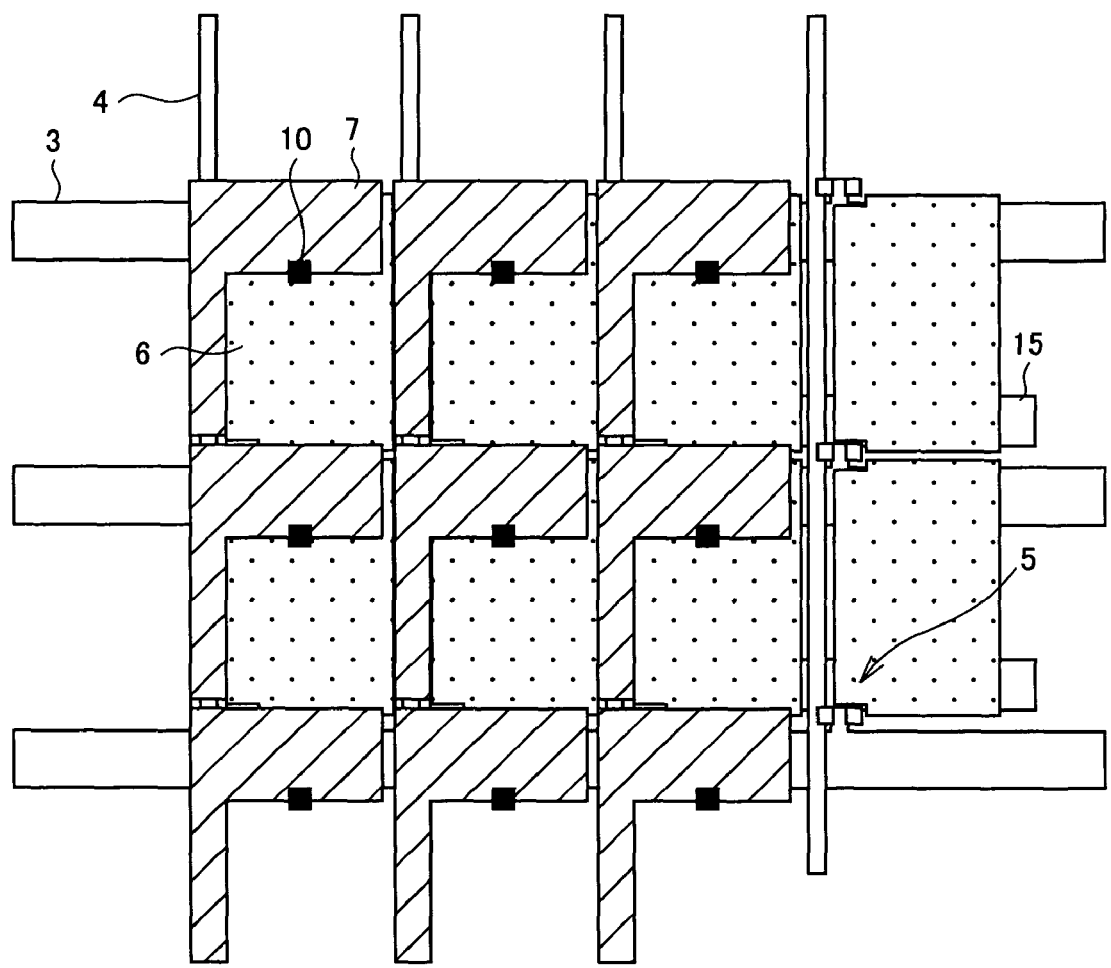
FIG. 5 is a plan view showing another example of the active matrix substrate of First Embodiment.
Figure 6:
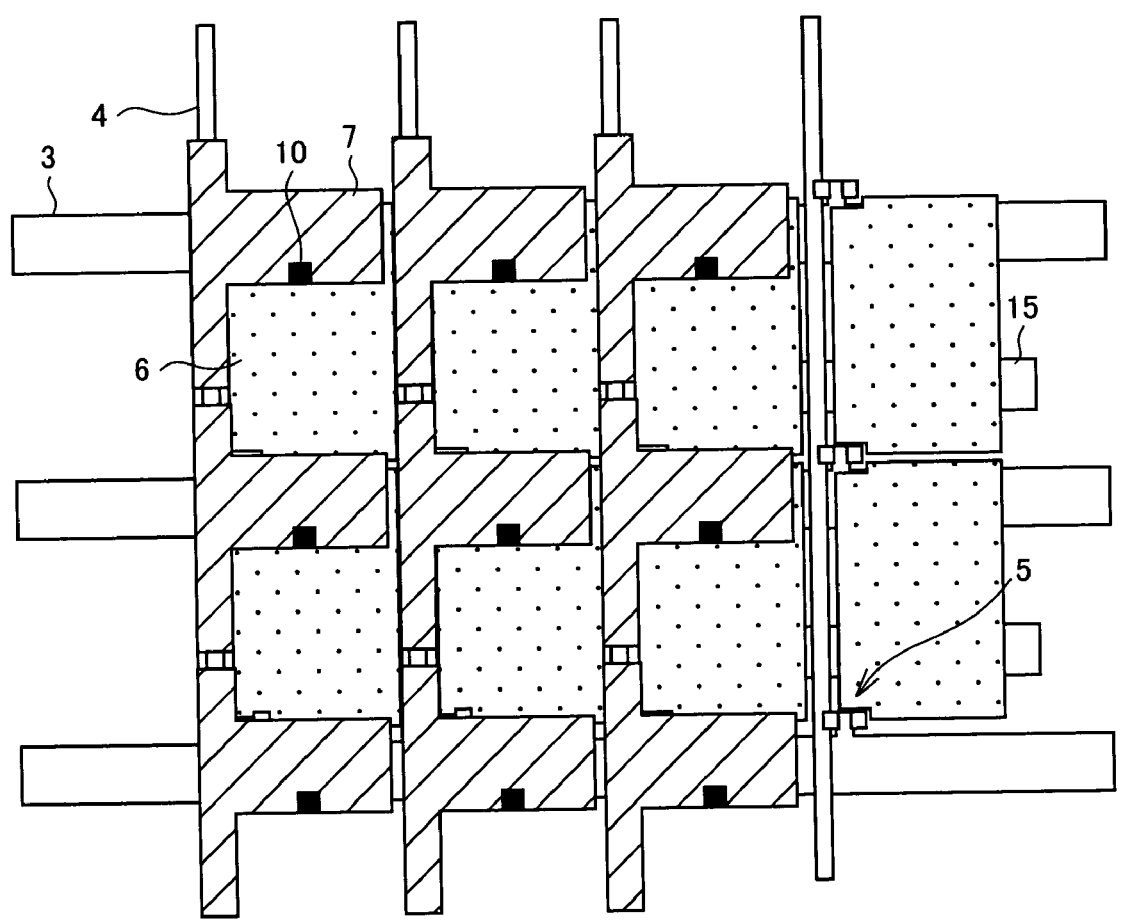
FIG. 6 is a plan view showing a further example of the active matrix substrate of First Embodiment.
Figure 7:
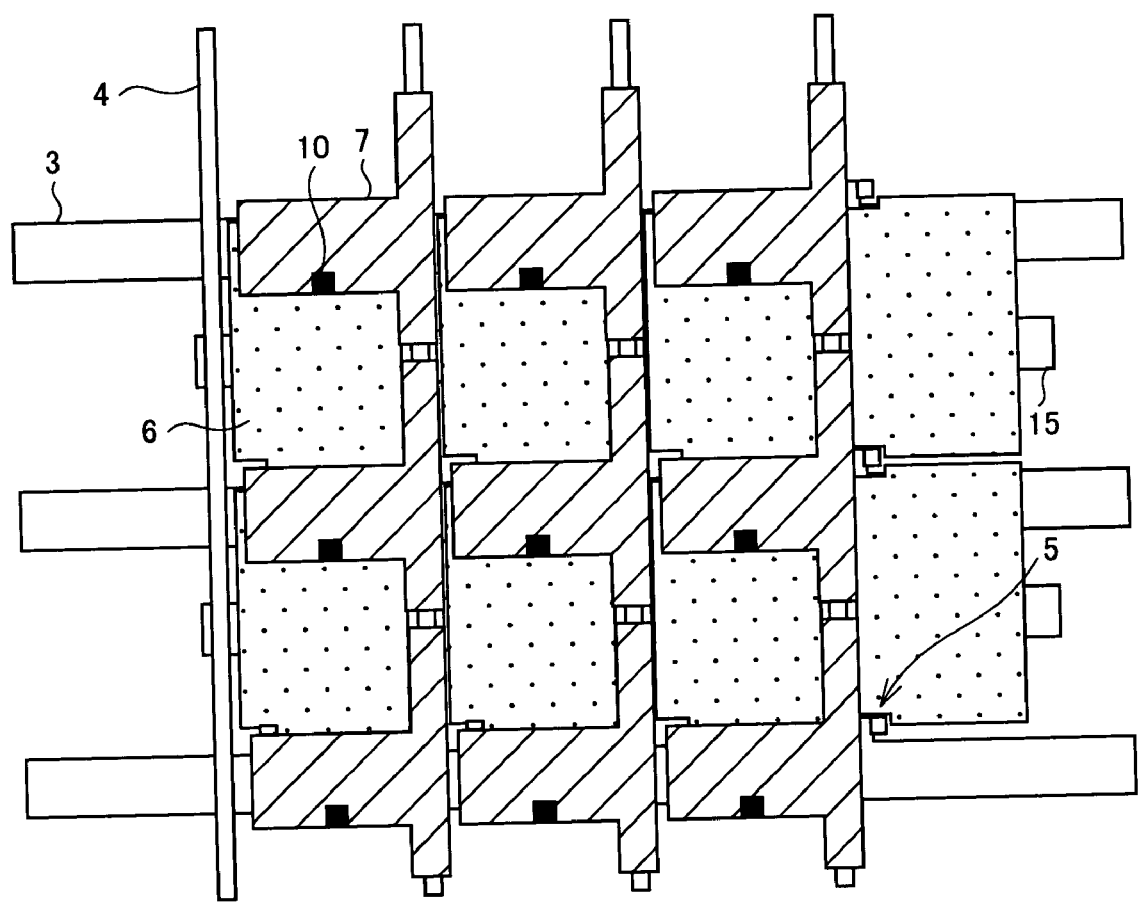
FIG. 7 is a plan view showing yet another example of the active matrix substrate of First Embodiment.
Figure 8:
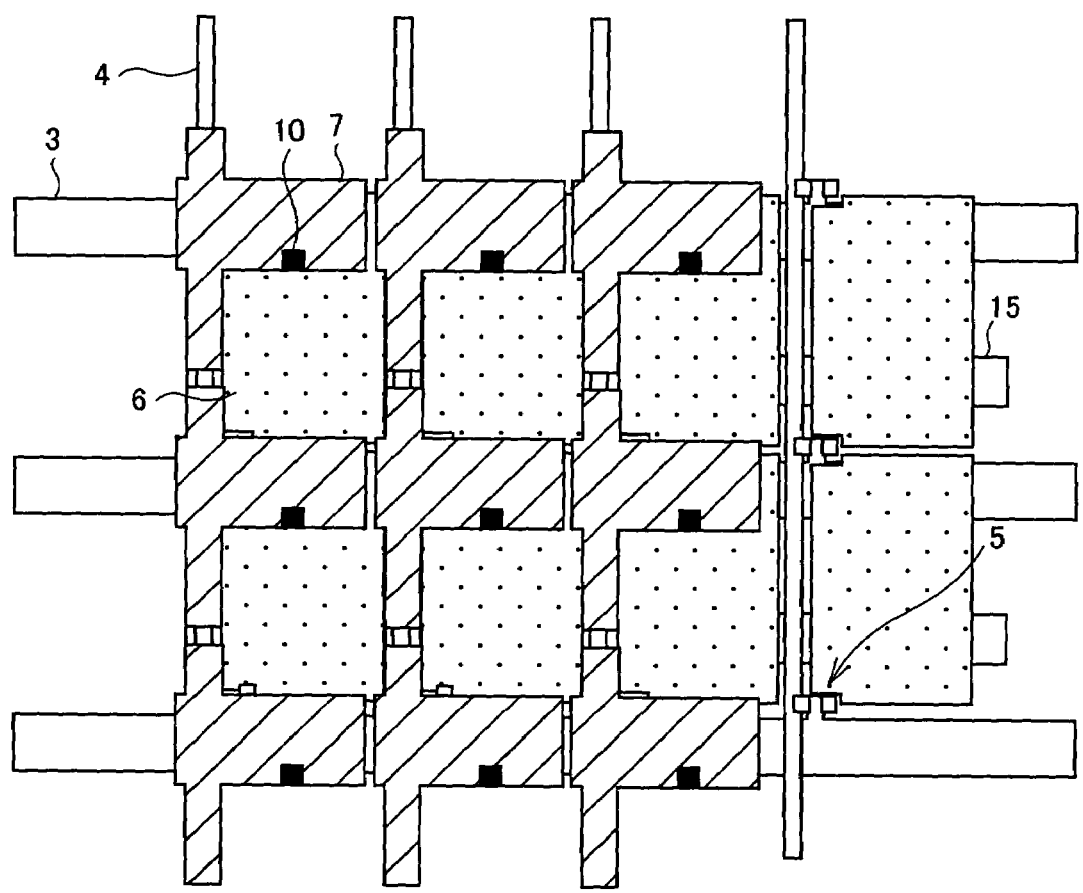
FIG. 8 is a plan view showing still another example of the active matrix substrate of First Embodiment.
Figure 9:
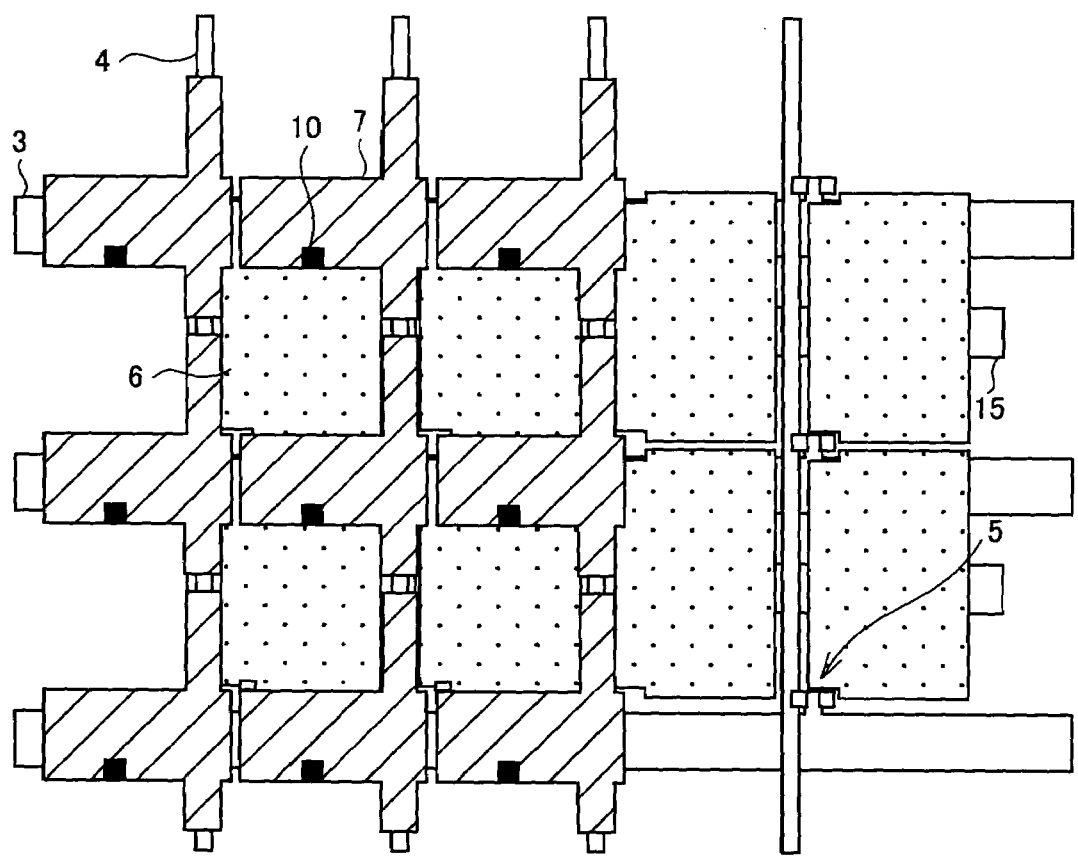
FIG. 9 is a plan view showing still further another example of the active matrix substrate of First Embodiment.
Figure 10:
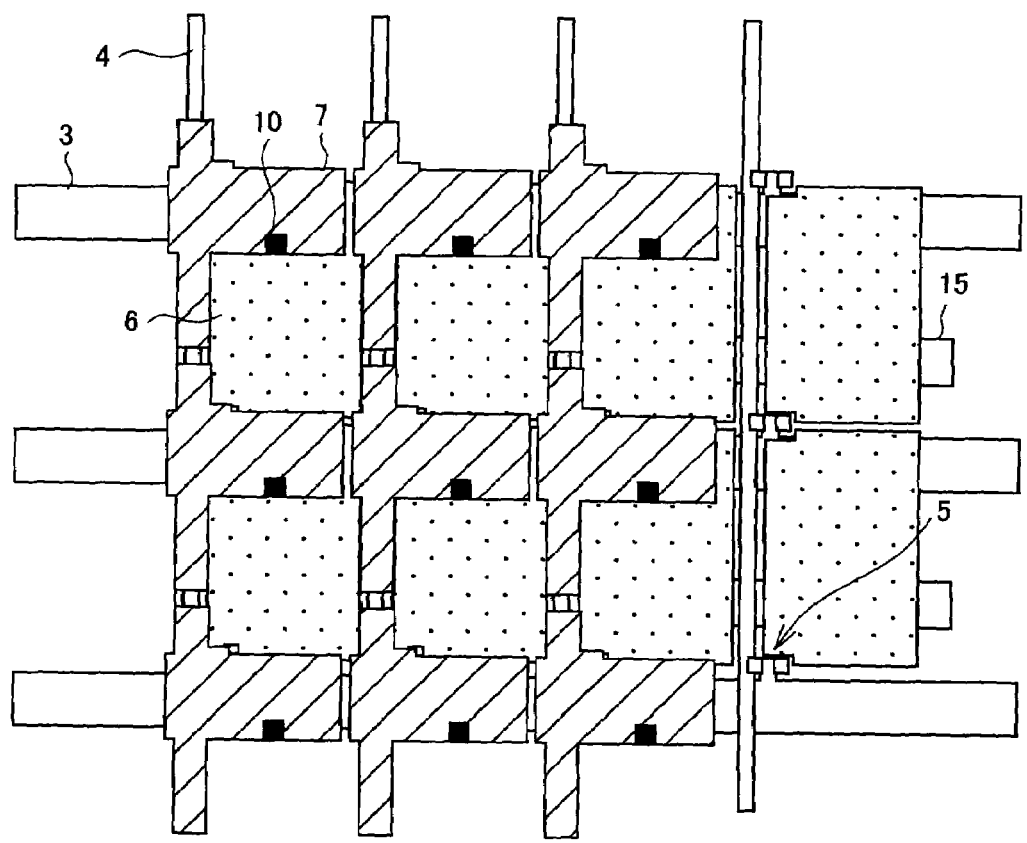
FIG. 10 is a plan view showing yet still another example of the active matrix substrate of First Embodiment.
Figure 11:
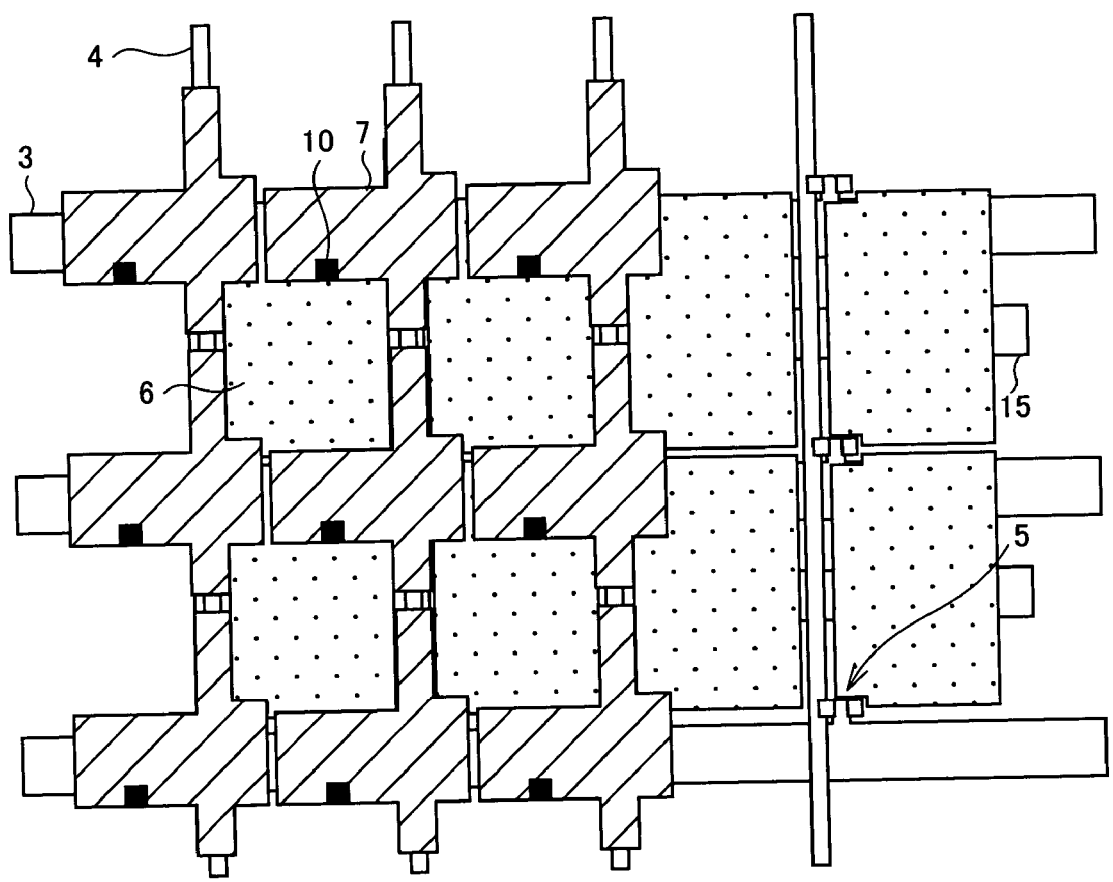
FIG. 11 is a plan view showing a yet further example of the active matrix substrate of First Embodiment.
Figure 12:
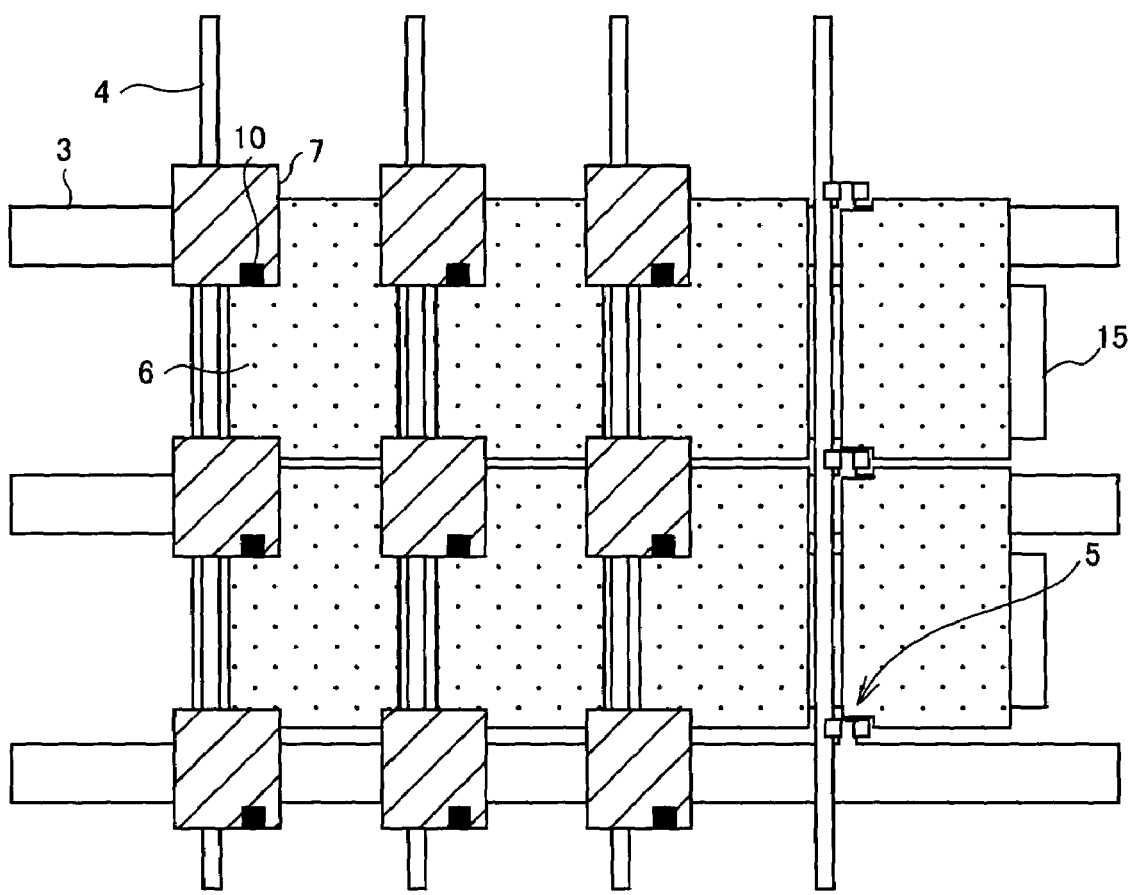
FIG. 12 is a plan view showing a still yet further example of the active matrix substrate of First Embodiment.
Figure 13:
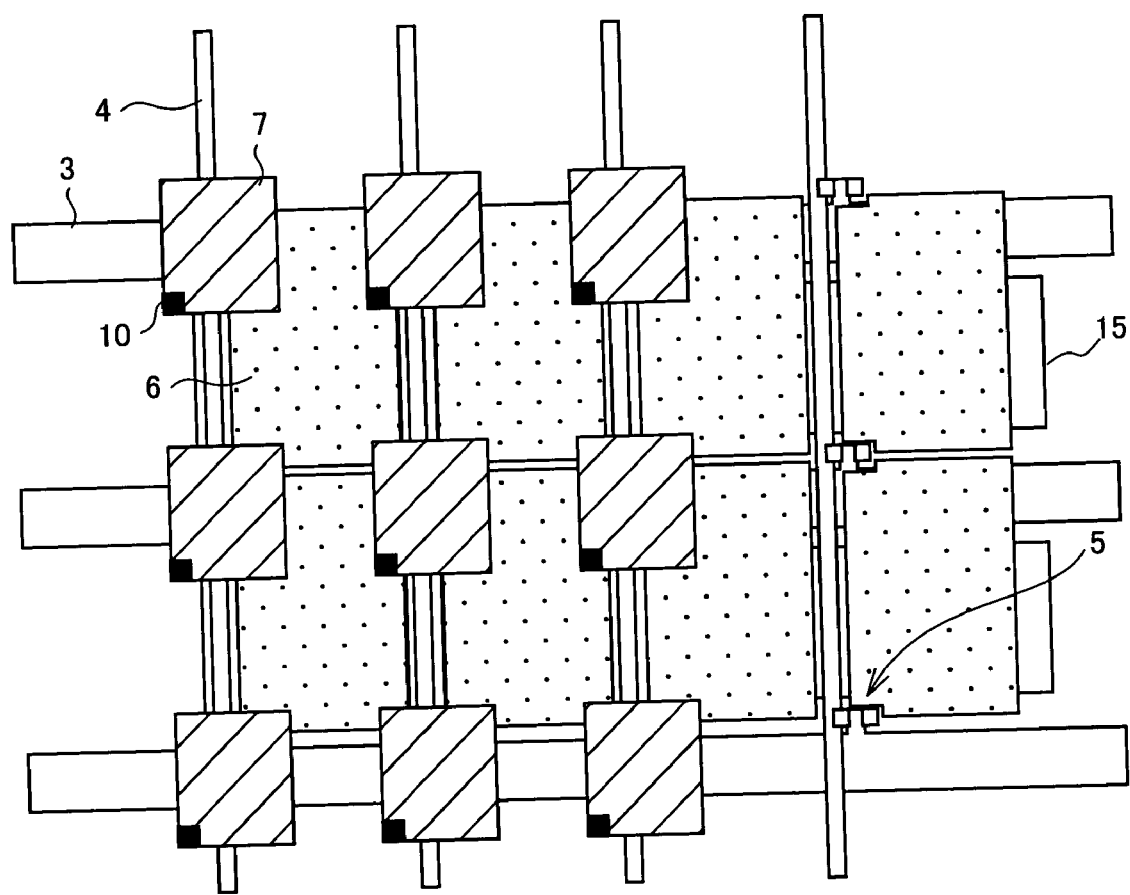
FIG. 13 is a plan view showing an additional example of the active matrix substrate of First Embodiment.

The shape of the reflective electrode 7 is not limited, and may be varied in many ways. The reflective electrode 7 may have a substantial "L" shape as shown in FIG. 5, a substantial "T" shape as shown in FIGS. 6 and 7, a substantial "+" shape as shown in FIGS. 8 through 11, a rectangular shape as shown in FIGS. 12 and 13, etc.

Further, in the conventional liquid crystal display panel of the transflective type, the gate bus line and the source bus line are located in the inter-pixel region. Thus, each of the bus lines is designed to have a width as narrow as possible, because an aperture ratio of the liquid crystal display panel decreases as each of the bus lines becomes wider.

In contrast, in the liquid crystal display panel in accordance with the present embodiment, the gate bus line 3 and the source bus line 4 are covered with the reflective electrode 7, and most of the line areas are used as the reflection region. Thus, even when the gate bus line 3 and the source bus line 4 become wider, this is not likely to decrease the aperture ratio. Therefore, in particular, by forming the gate bus line 3 wider to decrease the line resistance, as shown in FIGS. 5 through 13, it is possible to reduce bad effects such as signal delay due to the line resistance.

Further, in the arrangement in which the gate bus line 3 is formed wider, the transparent electrodes 6 on both sides of the gate bus line 3 may be arranged so that an edge portion of each of the transparent electrodes 6 superposes the gate bus line 3 in question (Namely, the inter-pixel region of adjacent transparent electrodes 6 that sandwich the gate bus line 3 rests on the gate bus line 3 in question), thereby eliminating the blank regions 14 on both sides of the gate bus line 3.

Further, each of the liquid crystal display panels shown in FIGS. 5 through 13 is provided with the light-shielding layer 15. The light-shielding layer 15 may be provided in any island shape corresponding to a portion to be shielded (namely, corresponding to the blank region 14).

Further, to increase the ratio of the transmission region in the liquid crystal display device of the transflective type in accordance with the present embodiment, it is most preferable that the reflective electrode 7, which has a rectangular shape, is arranged so as to cover each portion where the inter-pixel region extending in the vertical scanning direction between the transparent electrodes 6 and the inter-pixel region extending in the horizontal scanning direction between the transparent electrodes 6 cross, as shown in FIGS. 12 and 13. This is because the reflective electrode 7 can cover a larger ratio of the inter-pixel region with respect to the transparent electrodes 6.

[Second Embodiment]

The following will explain another embodiment of the present invention, with reference to the drawings.

First Embodiment has an arrangement in which the reflective electrode 7 covers the inter-pixel region of the transparent electrodes 6 with respect to both vertical and horizontal scanning directions. However, in the liquid crystal display device of the transflective type of the present invention, the reflective electrode 7 may cover the inter-pixel region of the transparent electrodes 6 with respect to at least one of the vertical and horizontal scanning directions. The present embodiment has an arrangement in which the reflective electrode 7 only covers the inter-pixel region extending in the horizontal scanning direction between the transparent electrodes 6.

Figure 14:
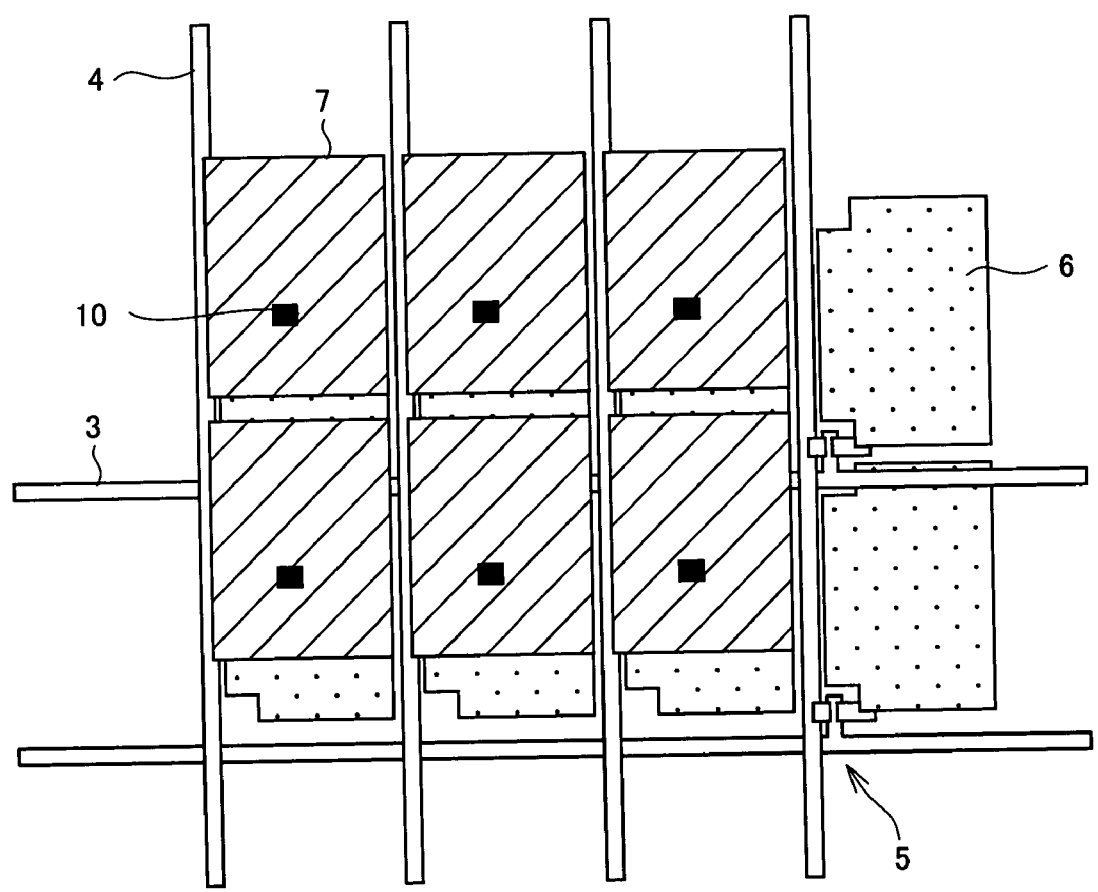
FIG. 14 is a plan view schematically showing an arrangement of an active matrix substrate of Second Embodiment, which shows another embodiment of the present invention.

An arrangement of an active matrix substrate used in a liquid crystal display device of the transflective type in accordance with the present embodiment will be explained with reference to FIG. 14. FIG. 14 shows an arrangement in which the reflective electrode 7 covers only the gate bus line 3 and the TFT element 5, and does not cover the source bus line 4. Note that, in FIG. 14, illustration of some members such as an electrode and wiring are omitted to clearly show the shape of the transparent electrode 6, the position where the TFT element 5 connects the transparent electrode 6, etc.

The liquid crystal display panel using the active matrix substrate having the arrangement shown in FIG. 14 is less advantageous than the liquid crystal display panel of First Embodiment in terms of the aperture ratio, because the reflective electrode 7 does not cover the source bus line 4. However, this liquid crystal display panel reduces a parasitic capacitance between the source bus line 4 and the pixel electrode (the reflective electrode 7, in particular). Thus, in a TFT liquid crystal display panel having a diagonal length of not less than about 10 cm, in particular, this arrangement is effective to reduce crosstalk (shadow) caused by capacitive coupling of the source bus line 4 and the pixel electrode.

Further, in the active matrix substrate shown in FIG. 14, the reflective electrode 7 covers the gate bus line 3. This eliminates the inter-pixel region extending in the horizontal scanning direction between the transparent electrodes 6, thereby improving the aperture ratio. Here, each of the reflective electrodes 7 is arranged to cover a gate bus line 3 which is one line above the gate bus line 3 that drives the pixel of the reflective electrode 7 in question. Namely, the reflective electrode 7 is arranged to cover a gate bus line 3 different from the gate bus line 3 that drives the pixel of the reflective electrode 7 in question.

When the reflective electrode 7 is arranged to cover the gate bus line 3 that drives the pixel of the reflective electrode 7 in question, the parasitic capacitance between the reflective electrode 7 and the gate bus line 3 increases. This accordingly increases a change in a pixel potential when the gate signal falls after writing, resulting in a display defect. Note that, also in the arrangement of First Embodiment, it is preferable that the reflective electrode 7 covers a gate bus line 3 different from the gate bus line 3 that drives the pixel of the reflective electrode 7 in question, when each of the reflective electrodes 7 covers the gate bus line 3.

When the above-described problem is negligible, the present invention of course includes an arrangement in which the reflective electrode 7 covers the gate bus line 3 of the pixel of the reflective electrode 7 in question.

Here, in the liquid crystal display panel having the arrangement shown in FIG. 14, when a pixel pitch is 270 $\mu$m in height and 90 $\mu$m in width, and a width between the reflective electrodes and a width between the transparent electrodes are both 7 $\mu$m, for example, the aperture ratio is calculated as follows: the aperture ratio of the reflection region is 89.7%, the aperture ratio of the transmission region is 2.4%, and the total aperture ratio is 92.2%. Namely, it is possible to realize a liquid crystal display panel of the transflective type having excellent light utilization efficiency.

Figure 15:
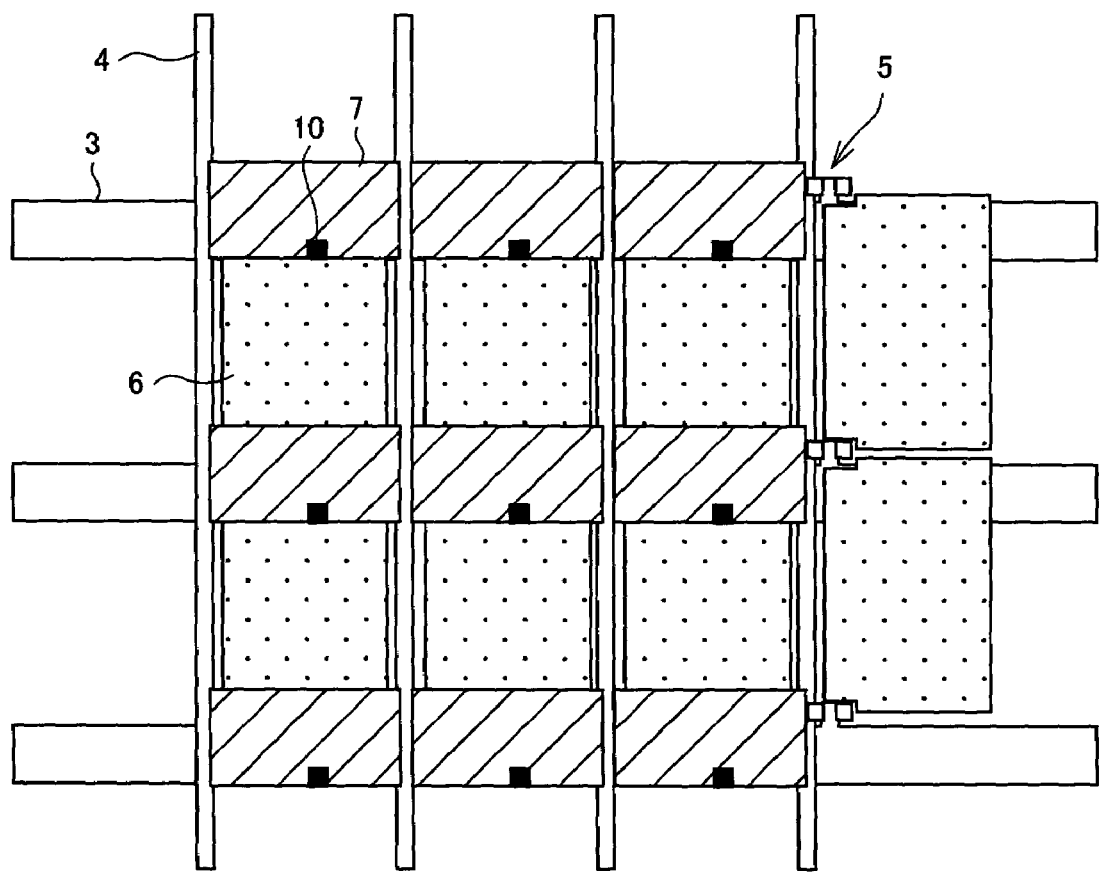
FIG. 15 is a plan view showing another example of the active matrix substrate of Second Embodiment.

Note that, the present embodiment has been explained an example which aims to obtain an area of the reflective electrode 7 as large as possible. However, a ratio of the reflection region to the transmission region is not limited to this. In other words, the transparent electrode 6 and the reflective electrode 7 can be set to have any shape and area. For example, as shown in FIG. 15, by designing the shape and area of the reflective electrode 7 variously, it is possible to desirably set a ratio of the reflection region to the transmission region.

[Third Embodiment]

The following will explain a further embodiment of the present invention, with reference to the drawings.

First Embodiment has an arrangement in which the reflective electrode 7 covers the inter-pixel region of the transparent electrodes 6 with respect to both vertical and horizontal scanning directions. However, in the liquid crystal display device of the transflective type of the present invention, the reflective electrode 7 may cover the inter-pixel region of the transparent electrodes 6 with respect to at least one of the vertical and horizontal scanning directions. The present embodiment has an arrangement in which the reflective electrode 7 only covers the inter-pixel region extending in the vertical scanning direction between the transparent electrodes 6.

Figure 16:
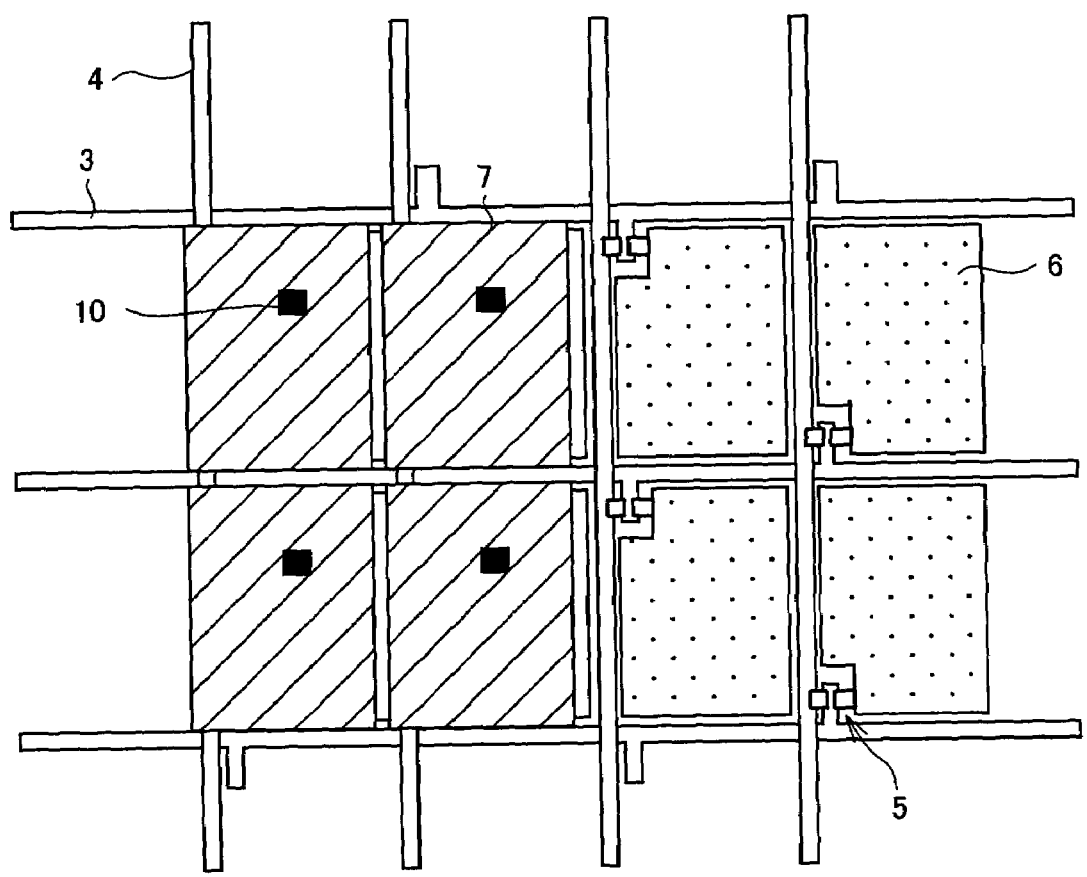
FIG. 16 is a plan view schematically showing an arrangement of an active matrix substrate of Third Embodiment, which shows a further embodiment of the present invention.

An arrangement of an active matrix substrate used in a liquid crystal display device of the transflective type in accordance with the present embodiment will be explained with reference to FIG. 16. FIG. 16 shows an arrangement in which the reflective electrode 7 covers only the source bus line 4 and the TFT element 5, and does not cover the gate bus line 3. Note that, in FIG. 16, illustration of some members such as an electrode and wiring are omitted to clearly show the shape of the transparent electrode 6, the position where the TFT element 5 connects the transparent electrode 6, etc.

The liquid crystal display panel using the active matrix substrate having the arrangement shown in FIG. 16 is less advantageous than the liquid crystal display panel of First Embodiment in terms of the aperture ratio, because the reflective electrode 7 does not cover the gate bus line 3. However, this liquid crystal display panel is effective for employing a structure to reduce flicker in which the TFT elements 5 are arranged in a zigzag manner with respect to the gate bus line, for example.

When the TFT elements 5 are arranged in a zigzag manner with respect to the gate bus line 3, if the reflective electrode 7 covers the gate bus line 3, the reflective electrode 7 covers a portion of the gate bus line 3 that drives the pixel of the reflective electrode 7 in question. Namely, as shown in FIG. 16, when the TFT elements 5 are arranged in a zigzag manner with respect to the gate bus line 3, if the reflective electrodes 7 are linearly arranged to cover the gate bus line 3, the reflective electrode 7 covers the gate bus line 3 that drives the pixel of the reflective electrode 7 in question, on either the column where the TFT elements 5 are arranged below the gate bus line 3 or the column where the TFT elements 5 are arranged above the gate bus line 3. When the reflective electrode 7 covers the gate bus line 3 that drives the pixel of the reflective electrode 7 in question, the parasitic capacitance between the reflective electrode 7 and the gate bus line 3 increases. This accordingly increases a change in a pixel potential when the gate signal falls after writing, resulting in a display defect.

Therefore, in the active matrix substrate shown in FIG. 16, the reflective electrode 7 covers the source bus line 4 so as to eliminate the inter-pixel region extending in a vertical scanning direction between the transparent electrodes 6, thereby improving the aperture ratio; and the reflective electrode 7 does not cover the gate bus line 3, thereby showing fine display.

Further, in the arrangement in which the TFT elements 5 are arranged in a zigzag manner with respect to the gate bus line 3, by arranging the reflective electrodes 7 on the same column to shift in the vertical scanning direction, the reflective electrode 7 can cover a gate bus line 3 rather than the gate bus line 3 that drives the pixel of the reflective electrode 7 in question. However, in this arrangement, the reflective electrodes 7 on the same column are arranged in a zigzag manner, and may thus cause a problem such as line blurring when displaying a straight line.

Here, in the liquid crystal display panel having the arrangement shown in FIG. 16, when a pixel pitch is 270 $\mu$m in height and 90 $\mu$m in width, and a width between the reflective electrodes and a width between the transparent electrodes are both 7 $\mu$m, for example, the aperture ratio is calculated as follows: the aperture ratio of the reflection region is 89.8%, the aperture ratio of the transmission region is 7.3%, and the total aperture ratio is 97.1%. Namely, it is possible to realize a liquid crystal display panel of the transflective type having excellent light utilization efficiency.

Figure 17:
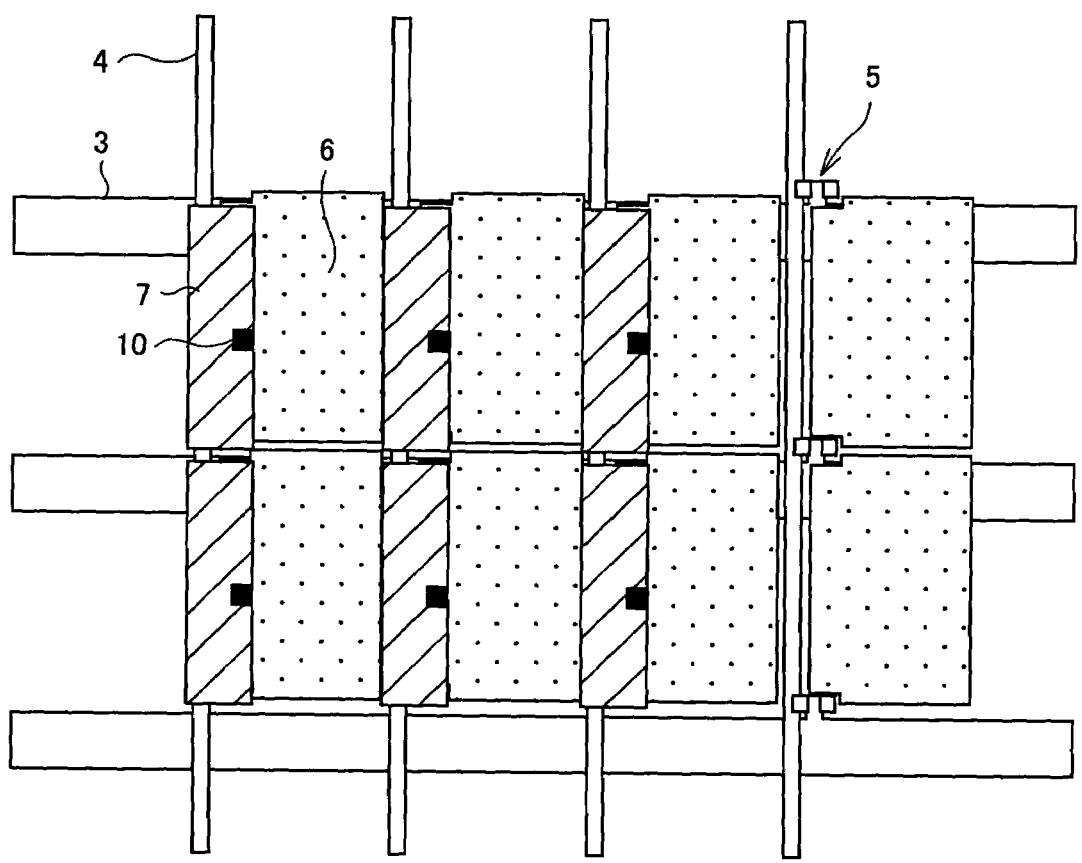
FIG. 17 is a plan view showing another example of the active matrix substrate of Third Embodiment.
Figure 18:
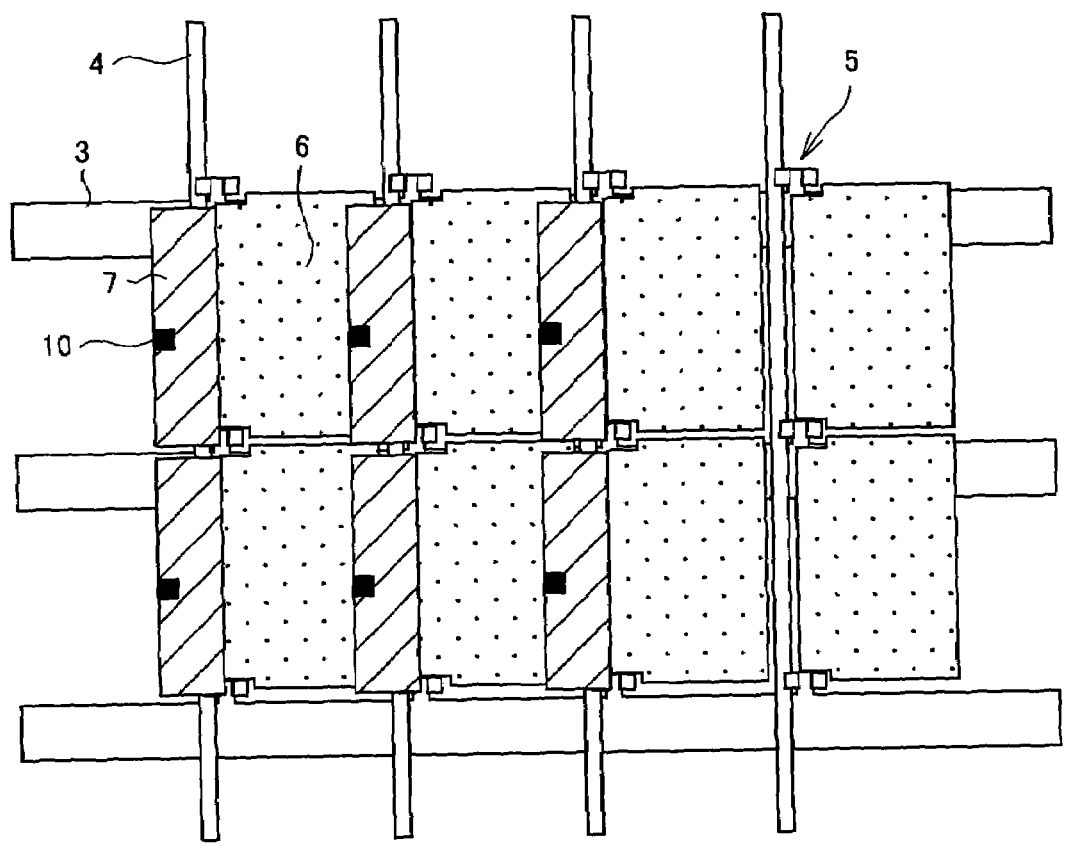
FIG. 18 is a plan view showing a further example of the active matrix substrate of Third Embodiment.

Note that, the present embodiment has been explained an example which aims to obtain an area of the reflective electrode 7 as large as possible. However, a ratio of the reflection region to the transmission region is not limited to this. In other words, the transparent electrode 6 and the reflective electrode 7 can be set to have any shape and area. For example, as shown in FIGS. 17 and 18, by designing the shape and area of the reflective electrode 7 variously, it is possible to desirably set a ratio of the reflection region to the transmission region. Further, in the arrangement in which the reflective electrode 7 covers the source bus line 4, the reflective electrode may cover the source bus line 4 connected with the pixel of the reflective electrode 7 in question, or may cover any other source bus line 4.

[Fourth Embodiment]

The following will explain yet another embodiment of the present invention with reference to the drawings.

First through Third Embodiments are arranged so that the reflection region overlaps the transmission region at least part of the circumference of the pixel electrode, and thus the overlapping portion eliminates the inter-pixel region so as to improve the aperture ratio. However, the present invention is not limited to this. Even when there is the inter-pixel region, the aperture ratio can be improved by narrowing the inter-pixel region compared with the conventional arrangement. Such an arrangement will be explained in the present embodiment.

An arrangement of an active matrix substrate used in a liquid crystal display device of a transflective type in accordance with the present embodiment will be explained with reference to FIGS. 19 and 20.

An active matrix substrate 51 is so arranged that the gate bus line 3, the source bus line 4, and the TFT element 5 as the switching element are formed on the transparent substrate 2 such as glass. Like the arrangement of First Embodiment, the arrangement thus far is the same with the conventional arrangement, thus their detailed explanation will be omitted here.

The drain of the TFT element 5 is connected with a connecting electrode 52, over which a transparent insulating layer 53 is formed. The transparent insulating layer 53 has a contact hole 54 at a portion corresponding to the connecting electrode 52. The connecting electrode 52 and the pixel electrode are connected with each other via the contact hole 54.

In the active matrix substrate 51 in accordance with the present embodiment, the pixel electrode is composed of the transparent electrode 6 and the reflective electrode 7. However, in the active matrix substrate 51, an insulating layer is not provided between the transparent electrode 6 and the reflective electrode 7. Instead, both of the transparent electrode 6 and the reflective electrode 7 are formed almost at the same layer on the transparent insulating layer 53.

Further, in the active matrix substrate 51, both of the transparent electrode 6 and the reflective electrode 7 are formed almost at the same layer on the transparent insulating layer 53. Thus, it is required to provide the inter-pixel region between the transparent electrode 6 and the reflective electrode 7 so as to insulate adjacent pixels from one another.

In the active matrix substrate 51 as arranged above, however, a width of the inter-pixel region between the transparent electrode 6 and the reflective electrode 7 can be set in accordance with the positioning when the transparent electrode 6 and the reflective electrode 7 are patterned. In other words, the width is not limited by the etching. Thus, in the active matrix substrate 51, it is possible to form a sufficiently narrower inter-pixel region between the transparent electrode 6 and the reflective electrode 7, compared with the conventional arrangement. Therefore, it is possible to reduce the inter-pixel region to so as improve the aperture ratio.

The following will explain a procedure for manufacturing the active matrix substrate 51 as described above, with reference to FIGS. 21(a) through 21(j).

Figure 21:
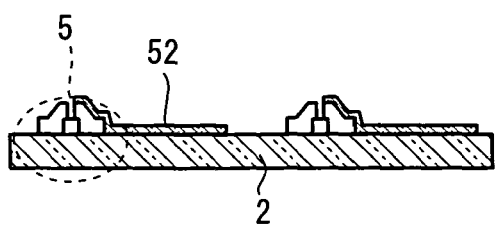
FIGS. 21(a) through 21(j) are cross-sectional views showing a procedure for manufacturing the active matrix substrate.
Figure 21:
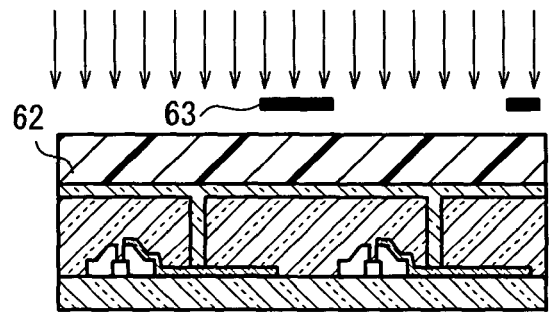
Figure 21:
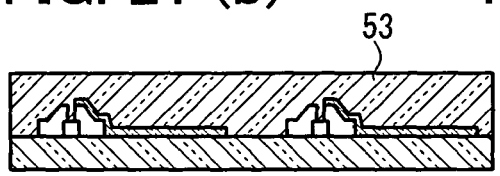
Figure 21:
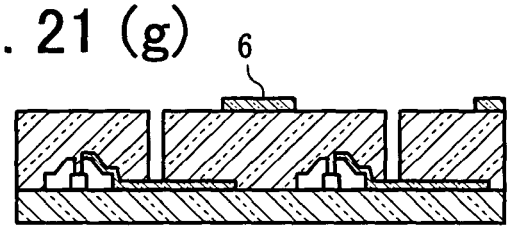
Figure 21:
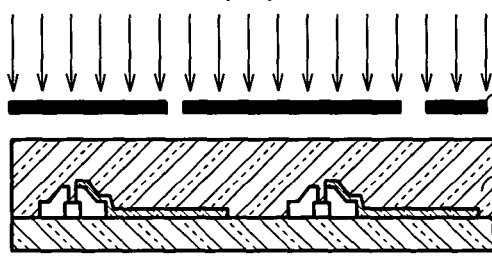
Figure 21:
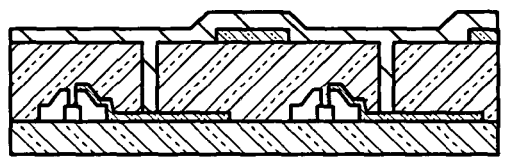
Figure 21:
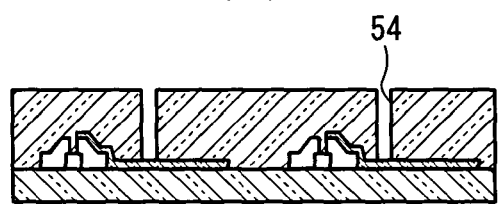
Figure 21:
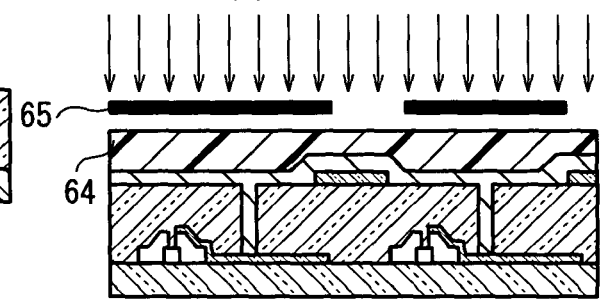
Figure 21:
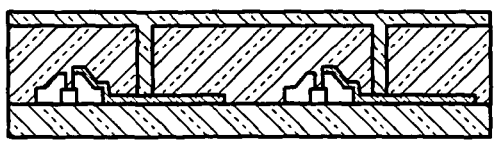
Figure 21:
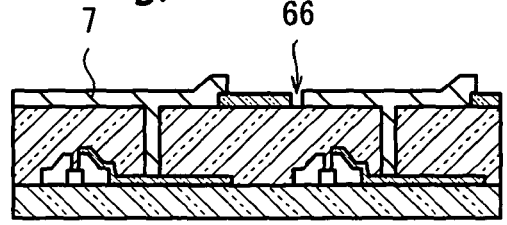
Figure 22:
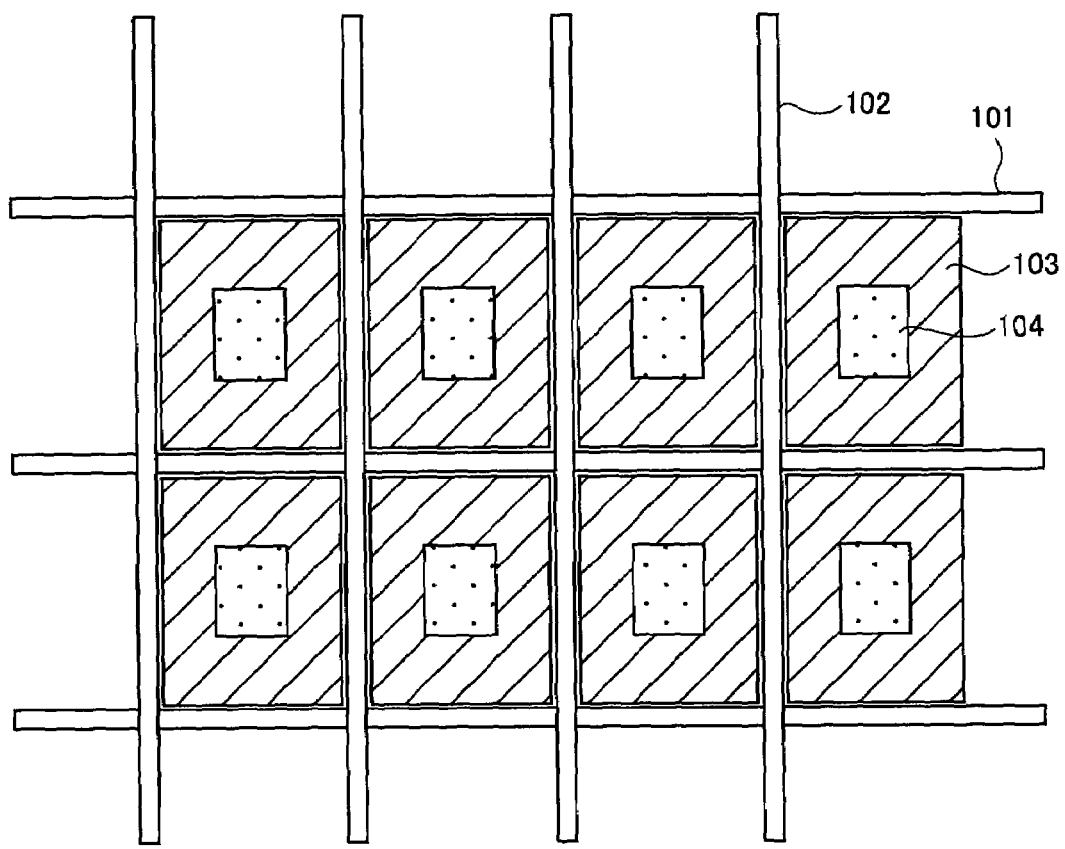
FIG. 22 is a plan view showing an arrangement of a conventional active matrix substrate used for a liquid crystal display panel of a transflective type.

FIG. 21(a) shows a state where the gate bus line 3, the source bus line 4, the TFT element 5, and the connecting electrode 52 are formed on the transparent substrate 2. Over this state, photosensitive acrylic resin is applied to form the transparent insulating layer 53, as shown in FIG. 21(b), which is then exposed using a photomask 61, as shown in FIG. 21(c). Following this, after undergoing developing and heating steps, the contact hole 54 is formed in the transparent insulating layer 53, as shown in FIG. 21(d).

Figure 19:
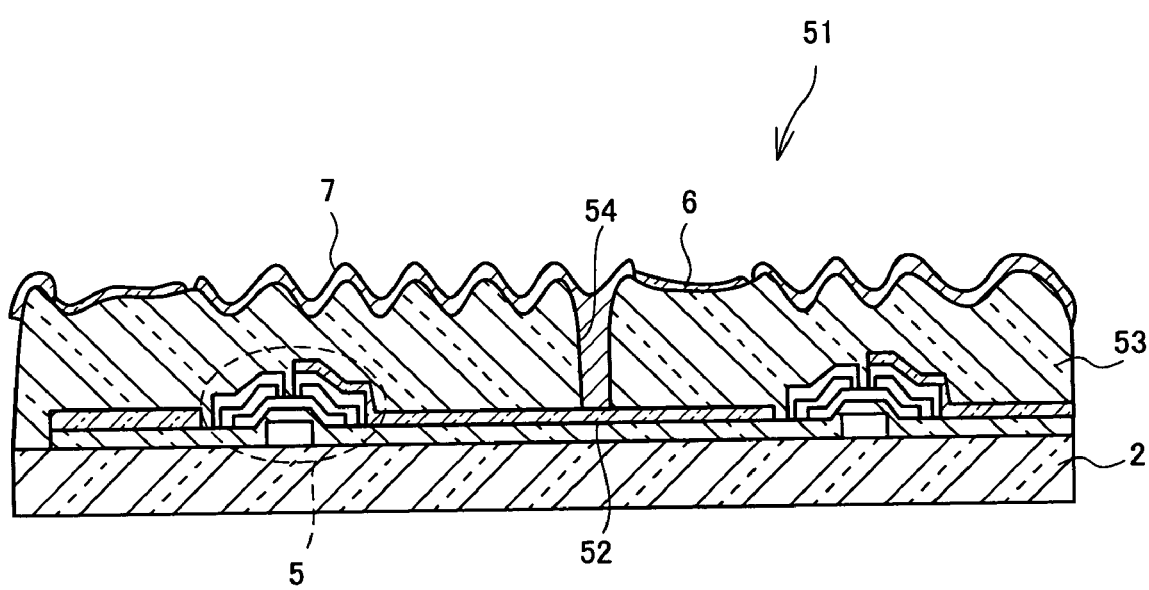
FIG. 19 is a cross-sectional view schematically showing an arrangement of an active matrix substrate of Fourth Embodiment, which shows yet another embodiment of the present invention.

Here, the transparent insulating layer 53 may have an uneven surface on a portion except the contact hole 54 (see FIG. 19). The uneven surface can be formed in such a manner that, using a photomask having a predetermined shape, the transparent insulating layer 53 is exposed with light having illuminance lower than the portion of the contact hole, and is then subjected to developing and heating steps. Alternatively, instead of the photosensitive acrylic resin, a dry film resist having an uneven surface may be pasted on by a laminating process in the initial state to form the transparent insulating layer 53. This uneven surface is preferable, particularly when formed on the reflection region, because the reflective electrode 7 formed on the uneven surface can utilize reflected light as diffused reflection.

Next, as shown in FIG. 21(e), a transparent electrode material is formed into a film over the active matrix substrate 51 in which the contact hole 54 is formed in the transparent insulating layer 53. Further, as shown in FIGS. 21(f) and 21(g), the transparent electrode 6 having a predetermined shape is patterned through patterning steps (deposition, photo (exposing), etching (developing)) using a resist 62 and a photomask 63.

Next, as shown in FIG. 21(h), a reflective electrode material is formed into a film. Further, as shown in FIGS. 21(i) and 21(j), the reflective electrode 7 having a predetermined shape is patterned through patterning steps (deposition, photo (exposing), etching (developing)) using a resist 64 and a photomask 65.

Here, the photomasks 63 and 65, which are used for patterning the transparent electrode 6 and the reflective electrode 7 respectively, can be adjusted in accordance with positioning accuracy of approximately 1 $\mu$m. Thus, as shown in FIG. 21(j), as for adjacent transparent electrode 6 and reflective electrode 7 that sandwich an inter-pixel region 66, the width of the inter-pixel region 66 can be adjusted to not more than 3 $\mu$m including side shift due to overetching of the transparent electrode 6 and the reflective electrode 7.

Thus, in the active matrix substrate 51, the inter-pixel region can be formed narrower than the conventional liquid crystal display panel in which the inter-pixel region is formed by etching (a width of not less than 5 $\mu$m is usually required to surely separate adjacent pixels from one another). Therefore, it is possible to realize a liquid crystal display panel having a high aperture ratio by reducing an area of the inter-pixel region.

The liquid crystal display panel having the arrangement in accordance with the present embodiment has beneficial features as described below.

Each of the arrangements of First through Third Embodiments has a double-story structure of the transparent electrode 6 and the reflective electrode 7 via the insulating layer 9. Further, in order to allow the transmission region and the reflection region to have the equal retardation value, the transparent electrode 6 is provided at a lower layer of the insulating layer 9, and the insulating layer 9 has the opening 11 at a portion corresponding to the transmission region (see FIG. 2).

In this structure, a sidewall portion of the opening 11 is not actually parallel to the normal direction of the display surface. Namely, the sidewall portion has a steep inclination over a certain amount of area. When Al as the reflective electrode 7 is provided on the inclined surface, light incident from above is reflected at a large degree on the steeply inclined surface and thus confined in the cell. Because of this, an area that does not contribute to display arises on the inclined portion, namely at the boundary portion between the reflection region and the transmission region.

The arrangement of the present embodiment achieves a multigap structure of the reflection region and the transmission region by providing a protrusion on the counter substrate (CF substrate) 21 side. This eliminates the inclined portion at the boundary of the reflection region and the transmission region, thereby preventing the reflective electrode 7 to be placed on the steeply inclined portion. Namely, the arrangement of the present embodiment cannot completely eliminate the inter-pixel region compared with the arrangements in First through Third Embodiments, but does not cause a problem such that the inclined portion decreases the display area. Of course, the area that does not contribute to display on the inclined portion is sufficiently smaller than the conventional inter-pixel region, but the arrangement of the present embodiment may achieve a higher aperture ratio than the arrangements in First through Third Embodiments, depending on design conditions.

Figure 20:
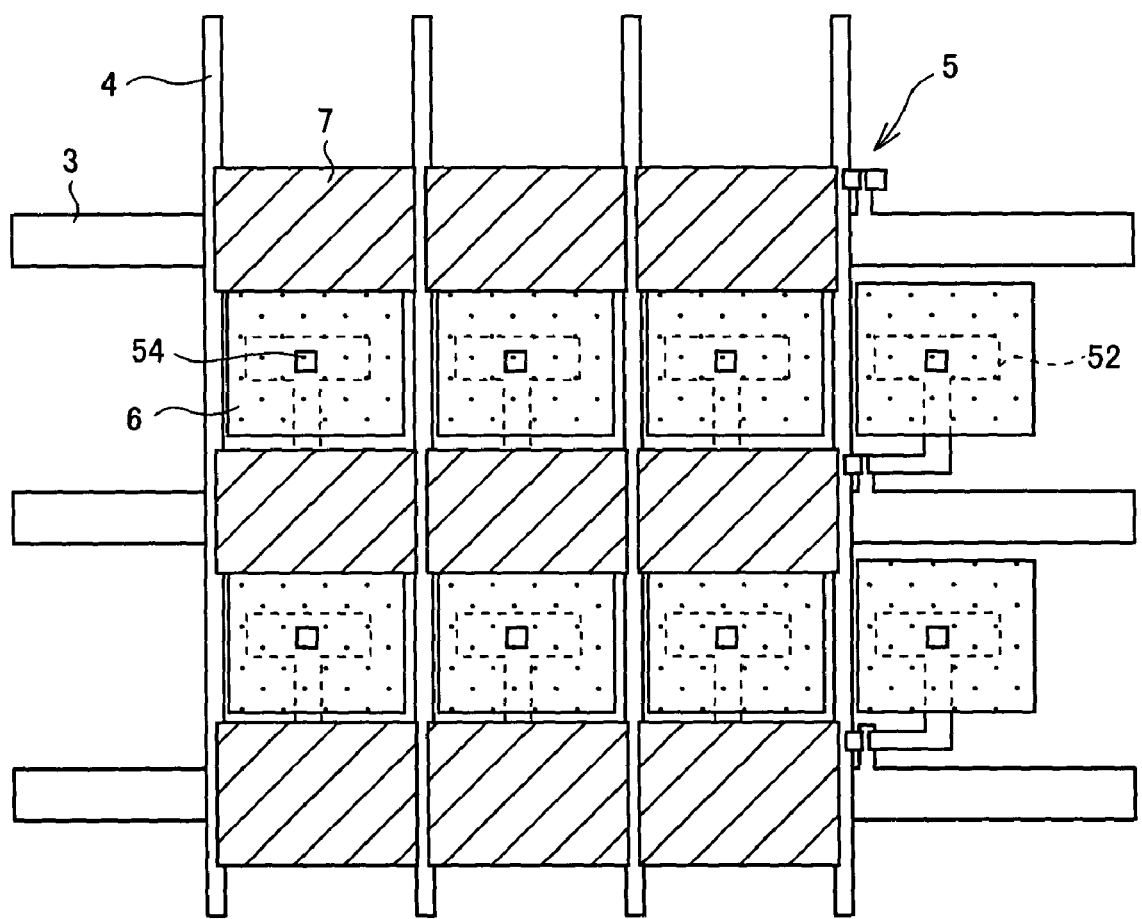
FIG. 20 is a plan view schematically showing an arrangement of the active matrix substrate.

Incidentally, in the active matrix substrate 51 shown in FIG. 19, the reflective electrode 7 is connected to the connecting electrode 52 via the contact hole 54, but the transparent 6 may be connected to the connecting electrode 52, as shown in FIG. 20. Note that, when the transparent electrode 6 is connected to the connecting electrode 52, the transparent electrode 6 is placed on the connecting electrode 52. Thus, the connecting electrode 52 needs to be formed with a transparent conductive film to prevent the lowering of the aperture ratio.

Further, in the active matrix substrate 51, the reflective electrode 7 may be formed to cover at least one of the gate bus line 3 and the source bus line 4. The achievable effects in this case are the same with those explained in Second and Third Embodiments.

Further, the active matrix substrate 51 in accordance with the present embodiment is preferably arranged so that, when the reflective electrode 7 covers the gate bus line 3, the reflective electrode 7 covers a gate bus line 3 different from the gate bus line 3 that drives the pixel of the reflective electrode 7 in question, as in First and Second Embodiments.

Further, when a liquid crystal display device of a transflective type using the active matrix substrate 51 is driven by the normally white mode, the contrast decrease can be prevented by providing the light-shielding layer on the blank region that is neither the reflection region nor the transmission region, as explained in First Embodiment.

Further, a liquid crystal display panel is composed in such a manner that the active matrix substrate 51 in accordance with the present embodiment and the counter substrate sandwich the liquid crystal layer. Here, the transparent electrode 6 and the reflective electrode 7 are formed almost at the same layer in the active matrix substrate 51. Thus, it is preferable that, in the counter electrode on the side of the counter substrate, the transmission region and the reflection region have different thicknesses, so as to reduce a difference in light path length between light passing through the reflection region and light passing through the transmission region. With this, retardation changes of the liquid crystal layer upon the voltage application become similar in the5 reflection region and the transmission region, thereby achieving fine display.

Further, a liquid crystal display device of a transflective type is composed in such a manner that a driving circuit, a light source 41 (see FIG. 3), etc. are mounted on each of the liquid crystal display panels explained in First through Fourth Embodiments.

As described above, an active matrix substrate in accordance with First through Fourth Embodiments, which includes pixel electrodes each having a reflective electrode 7 and a transparent electrode 6, is so arranged that (i) a reflective electrode 7 and (ii) an adjacent transparent electrode 6 adjacent to the reflective electrode without being electrically connected are positioned in such a manner that (A) a border of a reflection region to which the reflective electrode 7 applies a voltage and (B) a border of a transmission region to which the adjacent transparent electrode 6 applies a voltage at least partly overlap (First through Third Embodiments) or are closely located (Fourth Embodiment) with each other, when viewed in a normal direction of a display surface of the active matrix substrate.

With this arrangement, a reflective electrode 7 and a transparent electrode 6 that are adjacent to each other without being electrically connected are positioned in such a manner that the border of the reflection region and the border of the transmission region at least partly overlap (or are closely located) with each other. This eliminates (or reduces) the inter-pixel region at a portion where the border of the reflection region and the border of the transmission region overlap (or are closely located) with each other.

With this, in a liquid crystal display panel using the above-described active matrix substrate, it is possible to reduce a ratio of the inter-pixel region, which does not contribute to display, with respect to the entire display screen, thereby achieving a liquid crystal display panel having a high aperture ratio.

Further, the active matrix substrate in accordance with First through Third Embodiments is provided with a plurality of gate bus lines 3 and a plurality of source bus lines 4 that cross with each other; a TFT element 5 provided at each intersection where the plurality of gate bus lines 3 and the plurality of source bus lines 4 cross; and a pixel electrode connected to the TFT element 5 and composed of the transparent electrode 6 and the reflective electrode 7. Then, the reflective electrode 7 and the transparent electrode 6 sandwich an insulating layer 9, so that the transparent electrode 6 is on an incident side of light from a light source and the reflective electrode 7 is on a side of a surface facing a liquid crystal layer. Further, the reflective electrode 7 is arranged on the insulating layer 9 so as to straddle at least one of the gate bus line 3 and the source bus line 4. Namely, an edge portion of the reflective electrode 7 partly superposes an edge portion of the adjacent transparent electrode 6 that is adjacent to the reflective electrode 7 without being electrically connected, when viewed in the normal direction of the display surface of the active matrix substrate.

In the above-arranged active matrix substrate, an edge portion of the reflective electrode 7 partly superposes an edge portion of the adjacent transparent electrode 6 that is adjacent to the reflective electrode 7 without being electrically connected, so that the reflection region and the transmission region overlap with each other when viewed in the normal direction of the display surface of the active matrix substrate.

With this, the inter-pixel region is completely eliminated at the portion where the reflection region and the transmission region overlap. Namely, in a liquid crystal display panel using the above-described active matrix substrate, it is possible to achieve a high aperture ratio. Further, the reflective electrode 7 and the transparent electrode 6 that overlap with each other can be electrically insulated with each other by sandwiching the insulating layer 9 therebetween.

Further, the active matrix substrate in accordance with Fourth Embodiment is provided with a plurality of gate bus lines 3 and a plurality of source bus lines 4 that cross with each other; a TFT element 5 provided at each intersection where the plurality of gate bus lines 3 and the plurality of source bus lines 4 cross; and a pixel electrode connected to the TFT element 5 and composed of the transparent electrode 6 and the reflective electrode 7.

Then, both of the reflective electrode 7 and the transparent electrode 6 are formed to sandwich a transparent insulating layer 53 with respect to the gate bus line 3, the source bus line 4, and the TFT element 5, and an inter-pixel region between the reflective electrode 7 and the adjacent transparent electrode 6 that are adjacent to each other without being electrically connected is at least partly formed to have a width of not more than 3 $\mu$m.

In the above-described active matrix substrate, both of the reflective electrode 7 and the transparent electrode 6 are formed almost at the same layer on the transparent insulating layer 53. Thus, it is required to provide the inter-pixel region for insulation between the electrodes of different pixels.

Here, the inter-pixel region formed between the same type of electrodes (namely, between the reflective electrodes 7 or between the transparent electrodes 6) generally requires a width of at least not less than 5 $\mu$m, in accordance with etching accuracy. In contrast, the inter-pixel region between the different types of electrodes (namely between the reflective electrode 7 and the transparent electrode 6) can be adjusted in accordance with the positioning accuracy when the pattern is formed. Thus, it becomes possible to form a sufficiently narrow (not more than 3 $\mu$m) inter-pixel region compared with the conventional inter-pixel region between the same type of electrodes.

Therefore, the inter-pixel region between the reflective electrode 7 and the adjacent transparent electrode 6 adjacent to the reflective electrode 7 without being electrically connected is at least partly formed to have a width of not more than 3 $\mu$m, thereby reducing the inter-pixel region that does not contribute to display. Namely, it is possible to attain a high aperture ratio in a liquid crystal display panel using the above-described active matrix substrate.

As described above, an active matrix substrate of the present invention, used for a liquid crystal display device of a transflective type that includes pixel electrodes each having a reflective electrode and a transparent electrode, is so arranged that (i) a reflective electrode and (ii) an adjacent transparent electrode adjacent to the reflective electrode without being electrically connected are positioned in such a manner that (A) a border of a reflection region to which the reflective electrode applies a voltage and (B) a border of a transmission region to which the adjacent transparent electrode applies a voltage at least partly overlap or are closely located with each other, when viewed in a normal direction of a display surface of the active matrix substrate.

With this arrangement, a reflective electrode and a transparent electrode that are adjacent to each other without being electrically connected are positioned in such a manner that the border of the reflection region and the border of the transmission region at least partly overlap (or are closely located) with each other. This eliminates (or reduces) the inter-pixel region at a portion where the border of the reflection region and the border of the transmission region overlap (or are closely located) with each other.

With this, in a liquid crystal display panel using the above-described active matrix substrate, it is possible to reduce a ratio of the inter-pixel region, which does not contribute to display, with respect to the entire display screen, thereby achieving a liquid crystal display panel having a high aperture ratio.

Further, the active matrix substrate of the present invention may be arranged so as to include an insulating layer sandwiched between the reflective electrode and the transparent electrode, the transparent electrode being on an incident side of light from a light source and the reflective electrode being on a side of a surface facing a liquid crystal layer; an edge portion of the reflective electrode partly superposing an edge portion of the adjacent transparent electrode adjacent to the reflective electrode without being electrically connected, when viewed in the normal direction of the display surface of the active matrix substrate.

With this arrangement, an edge portion of the reflective electrode partly superposes an edge portion of the adjacent transparent electrode that is adjacent to the reflective electrode without being electrically connected, so that the reflection region and the transmission region overlap with each other when viewed in the normal direction of the display surface of the active matrix substrate.

With this, the inter-pixel region is completely eliminated at the portion where the reflection region and the transmission region overlap with each other. Namely, in a liquid crystal display panel using the above-described active matrix substrate, it is possible to achieve a high aperture ratio. Further, the reflective electrode and the transparent electrode that overlap with each other can be electrically insulated with each other by sandwiching the insulating layer therebetween.

Further, the active matrix substrate of the present invention is preferably arranged so that the insulating layer has an opening at a portion corresponding to the transmission region.

In the arrangement where the insulating layer is provided between the reflective electrode and the transparent electrode, in order to form the transmission region using a region where the reflective electrode is not formed, the insulating layer may be transparent; or the insulating layer may have the opening at the transmission region.

With the above-mentioned arrangement, the insulating layer has the opening at a portion corresponding to the transmission region. With this, in a liquid crystal display panel using the above-described active matrix substrate, the transmission region and the reflection region can have different cell thicknesses of the liquid crystal layer so that the transmission region has the cell thickness more than the reflection region by a thickness of the insulating layer. In this case, retardation changes of the liquid crystal layer upon the voltage application can be similar in the reflection region and the transmission region, thereby achieving fine display.

Further, the active matrix substrate of the present invention may be arranged so as to include a transparent insulating layer sandwiched between (A) both of the reflective electrode and the transparent electrode and (B) wiring and a switching element that apply a signal voltage to the electrodes; and an inter-pixel region between the reflective electrode and the adjacent transparent electrode adjacent to the reflective electrode without being electrically connected, at least part of the inter-pixel region having a width of not more than 3 $\mu$m.

With this arrangement, both of the reflective electrode and the transparent electrode are formed almost at the same layer on the transparent insulating layer. Thus, it is required to provide the inter-pixel region for insulation between the electrodes of different pixels.

Here, the inter-pixel region formed between the same type of electrodes (namely, between the reflective electrodes or between the transparent electrodes) generally requires a width of at least not less than 5 $\mu$m, depending on etching accuracy. In contrast, the inter-pixel region between the different types of electrodes (namely between the reflective electrode and the transparent electrode) can be adjusted with the positioning accuracy when the pattern is formed. Thus, it becomes possible to form a sufficiently narrow (not more than 3 $\mu$m) inter-pixel region compared with the conventional inter-pixel region between the same type of electrodes.

Therefore, the inter-pixel region between the reflective electrode and the adjacent transparent electrode is at least partly formed to have a width of not more than 3 $\mu$m, thereby reducing the inter-pixel region that does not contribute to display. Namely, it is possible to attain a high aperture ratio in a liquid crystal display panel using the above-described active matrix substrate.

Further, the active matrix substrate of the present invention is preferably arranged so that the reflective electrode does not cover source wiring, when viewed in the normal direction of the display surface of the active matrix substrate.

Conventionally, gate wiring and source wiring are located in the inter-pixel region on the active matrix substrate. In the arrangement where the inter-pixel region is reduced by closely locating the boundary of the reflection region and the boundary of the transmission region, as in the present invention, the reflective electrode covers at least part of either gate wiring or source wiring.

With the above-mentioned arrangement, the reflective electrode is arranged so as not to cover source wiring, thereby reducing the parasitic capacitance between the source wiring and the reflective electrode. This consequently reduces the crosstalk (shadow) caused by the capacitive coupling of the source wiring and the reflective electrode.

Further, the active matrix substrate of the present invention may be so arranged that the reflective electrode covers at least part of gate wiring, when viewed in the normal direction of the display surface of the active matrix substrate, and the reflective electrode covers gate wiring different from gate wiring that drives a pixel of the reflective electrode.

In an arrangement where the reflective electrode covers at least part of gate wiring, if the reflective electrode covers the gate bus line that drives the pixel of the reflective electrode in question, the parasitic capacitance between the reflective electrode and the gate wiring increases. This accordingly increases a change in a pixel potential when the gate signal falls after writing, causing a problem such as a display defect.

In contrast, in the above-mentioned arrangement, each reflective electrode is arranged so as to cover gate wiring different from gate wiring that drives the pixel of the reflective electrode in question, thereby obviating the above problem.

Further, the active matrix substrate of the present invention, used for a liquid crystal display device of the normally white mode, is preferably arranged so as to include a light-shielding layer located corresponding to a blank region that is neither the reflection region nor the transmission region.

With the active matrix substrate as arranged above, the inter-pixel region exists between the transparent electrodes and between the reflective electrodes. Thus, at a portion where the inter-pixel region between the transmission regions and the inter-pixel region between the reflection regions cross, a certain area of blank region arises, to which neither the transparent electrode nor the reflective electrode can apply a voltage.

The blank region always shows white display in the normally white mode, thus causing contrast decrease. However, with the above-mentioned arrangement, a light-shielding layer is provided corresponding to the blank region, thereby preventing the contrast decrease.

Further, a liquid crystal display panel of a transflective type of the present invention is so arranged that the above-described active matrix substrate and a counter substrate sandwich a liquid crystal layer.

Further, a liquid crystal display device of a transflective type of the present invention is provided with the above-described liquid crystal display panel.

In the above-arranged liquid crystal display panel of the transflective type and the liquid crystal display device of the transflective type, as in the above-described active matrix substrate, it is possible to reduce a ratio of the inter-pixel region, which does not contribute to display, with respect to the entire display screen, thereby achieving a high aperture ratio.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active matrix substrate used for a liquid crystal display device of a transflective type that includes pixel electrodes each having a reflective electrode and a transparent electrode, wherein:
    (i) a reflective electrode of a first pixel electrode and (ii) an adjacent transparent electrode of a second pixel electrode adjacent to said first pixel electrode, without being electrically connected, are positioned in such a manner that said reflective electrode and said adjacent transparent electrode at least partly overlap each other when viewed in a normal direction of a display surface of said active matrix substrate.

2. The active matrix substrate as set forth in claim 1, further comprising:
    an insulating layer sandwiched between said reflective electrode and said transparent electrode, said transparent electrode being on an incident side of light from a light source and said reflective electrode being on a side of a surface facing a liquid crystal layer,
    an edge portion of said reflective electrode partly superposing an edge portion of said adjacent transparent electrode adjacent to said reflective electrode without being electrically connected, when viewed in the normal direction of the display surface of said active matrix substrate.

3. The active matrix substrate as set forth in claim 2, wherein:
    the insulating layer has an opening at a portion corresponding to said transmission region.

4. The active matrix substrate as set forth in claim 2, wherein:
    said reflective electrode covers at least part of gate wiring, when viewed in the normal direction of the display surface of said active matrix substrate, and
    said reflective electrode covers gate wiring different from gate wiring that drives a pixel of said reflective electrode.

5. The active matrix substrate as set forth in claim 2, used for a liquid crystal display device of the normally white mode, further comprising:
    a light-shielding layer located corresponding to a blank region that is neither said reflection region nor said transmission region.

6. The active matrix substrate as set forth in claim 1, further comprising:
    a transparent insulating layer sandwiched between (A) both of said reflective electrode and said transparent electrode and (B) wiring and a switching element that apply a signal voltage to said electrodes; and
    an inter-pixel region between said reflective electrode and said adjacent transparent electrode adjacent to said reflective electrode without being electrically connected, at least part of said inter-pixel region having a width of not more than 3 $\mu$m.

7. The active matrix substrate as set forth in claim 6, wherein:
    said reflective electrode covers at least part of gate wiring, when viewed in the normal direction of the display surface of said active matrix substrate, and
    said reflective electrode covers gate wiring different from gate wiring that drives a pixel of said reflective electrode.

8. The active matrix substrate as set forth in claim 6, used for a liquid crystal display device of the normally white mode, further comprising:
    a light-shielding layer located corresponding to a blank region that is neither said reflection region nor said transmission region.

9. A liquid crystal display panel of a transflective type that includes pixel electrodes each having a reflective electrode and a transparent electrode, further comprising:
    a counter substrate;
    an active matrix substrate, in which (i) a reflective electrode of a first pixel electrode and (ii) an adjacent transparent electrode of a second pixel electrode adjacent to said first pixel electrode, without being electrically connected, are positioned in such a manner that said reflective electrode and said adjacent transparent electrode at least partly overlap each other when viewed in a normal direction of a display surface of said active matrix substrate; and
    a liquid crystal layer, sandwiched between said counter substrate and said active matrix substrate.

10. A liquid crystal display device of a transflective type that includes pixel electrodes each having a reflective electrode and a transparent electrode, further comprising a liquid crystal display panel of a transflective type, said panel including:
    a counter substrate;
    an active matrix substrate, in which (i) a reflective electrode of a first pixel electrode and (ii) an adjacent transparent electrode of a second pixel electrode adjacent to said first pixel electrode, without being electrically connected, are positioned in such a manner that said reflective electrode and said adjacent transparent electrode at least partly overlap each other when viewed in a normal direction of a display surface of said active matrix substrate; and
    a liquid crystal layer, sandwiched between said counter substrate and said active matrix substrate.

11. An active matrix substrate used for a liquid crystal display device of a transflective type that comprises:
    pixel electrodes each having a reflective electrode and a transparent electrode, wherein:

(i) a reflective electrode of a first pixel electrode and (ii) an adjacent transparent electrode of a second pixel electrode adjacent to said first pixel electrode, without being electrically connected, are positioned in a manner so that said reflective electrode and said adjacent transparent electrode at least partially overlap or are located within 3 μm of each other, when viewed in a normal direction of a display surface of said active matrix substrate.

12. A transflective liquid crystal display comprising:
an active matrix substrate including a first pixel comprising a first transparent electrode and a first reflective electrode both of which are electrically connected to a first switching element, and a second pixel adjacent to the first pixel, the second pixel comprising a second transparent electrode and a second reflective electrode both of which are electrically connected to a second switching element;
the active matrix substrate further including gates lines and source lines arranged in a crossing manner, so as to be in electrically communication with the first and second switching elements;
wherein the first reflective electrode overlaps the entirety of a segment of a gate line and/or source line.

13. The display of claim 12, wherein the first reflective electrode overlaps the entirety of respective segments of both a gate line and a source line.

14. The display of claim 12, wherein the switching elements are thin film transistors.

15. A transflective liquid crystal display including an active matrix substrate, the transflective liquid crystal display comprising:
pixel electrodes each having a reflective electrode and a transparent electrode, wherein:
a reflective electrode and a transparent electrode adjacent to said reflective electrode without being electrically connected are positioned in such a manner that the reflective electrode and the adjacent transparent electrode are electrically connected to different switching devices, and at least a border of said reflective electrode and a border of said adjacent transparent electrode at least partly overlap with each other when viewed in a normal direction of a display surface of said active matrix substrate.

* * * * *